(12) United States Patent
Bhatt et al.

(10) Patent No.: US 11,978,039 B2
(45) Date of Patent: May 7, 2024

(54) TRUST-BASED APPLICATION TO APPLICATION CONNECTIVITY

(71) Applicant: Wells Fargo Bank, N.A., San Francisco, CA (US)

(72) Inventors: Sudheendranath R. Bhatt, Bangalore (IN); Ramanathan Ramanathan, Bellevue, WA (US); Sai Krishna Madhavi Chitta, Secunderabad (IN); Rahul N. Jain, Hyderabad (IN); Pradeep R. Kumar, Bangalore (IN); Rameshchandra Bhaskar Ketharaju, Hyederabad (IN); Mushnuri Veera Venkata Kiran Kumar, Hyederabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/331,510

(22) Filed: Jun. 8, 2023

(65) Prior Publication Data
US 2023/0316260 A1   Oct. 5, 2023

Related U.S. Application Data

(60) Division of application No. 15/830,547, filed on Dec. 4, 2017, now Pat. No. 11,748,743, which is a
(Continued)

(51) Int. Cl.
*G06Q 20/36* (2012.01)
*G06Q 20/12* (2012.01)
(Continued)

(52) U.S. Cl.
CPC ............ *G06Q 20/36* (2013.01); *G06Q 20/12* (2013.01); *G06Q 20/325* (2013.01);
(Continued)

(58) Field of Classification Search
CPC ...... G06Q 20/36; G06Q 20/12; G06Q 20/325; G06Q 20/4014; G06Q 20/4012; G06Q 50/01; H04L 63/0428
(Continued)

(56) References Cited

U.S. PATENT DOCUMENTS 8,423,459 B1   4/2013   Green et al.
10,163,171 B1   12/2018   Vippagunta et al.
(Continued)

*Primary Examiner* — Courtney P Jones
(74) *Attorney, Agent, or Firm* — K&L Gates LLP

(57) ABSTRACT

The innovation discloses systems, methods and computer program products that reduce complexity and associated measures that are taken to ensure trust in secured transactions as necessitated by requirements present only in an ecommerce environment that do not have a parallel with traditional bricks and mortar commercial transactions. The innovation enables a multitude of mobile wallet applications to engage and obtain services from ecommerce applications wherein backend processing by a mobile wallet server obtains and delivers funds to ecommerce applications without sharing a subset of sensitive data, associated with a mobile wallet application user for the secured transactions. The innovation further provides for a wallet network to be initiated and engaged in which the secured transactions can take place, adopting and adapting social network application connectivity.

20 Claims, 13 Drawing Sheets

Related U.S. Application Data continuation-in-part of application No. 15/830,377, filed on Dec. 4, 2017, now Pat. No. 11,775,672.

(51) Int. Cl.
  *G06Q 20/32* (2012.01)
  *G06Q 20/40* (2012.01)
  *G06Q 50/00* (2012.01)
  *H04L 9/40* (2022.01)
  *G06F 21/62* (2013.01)

(52) U.S. Cl.
  CPC ......... *G06Q 20/4014* (2013.01); *G06Q 50/01* (2013.01); *H04L 63/0428* (2013.01); *G06F 21/6245* (2013.01); *G06Q 20/4012* (2013.01); *H04L 2463/102* (2013.01)

(58) Field of Classification Search
  USPC .......................................................... 705/44
  See application file for complete search history.

(56) References Cited

U.S. PATENT DOCUMENTS

| | | |
|---|---|---|
| 2009/0024747 A1 | 1/2009 | Moses et al. |
| 2011/0191209 A1 | 8/2011 | Gould et al. |
| 2012/0143761 A1 | 6/2012 | Doran et al. |
| 2014/0058937 A1 | 2/2014 | Watson |
| 2014/0108233 A1 | 4/2014 | Mlgören et al. |
| 2014/0108241 A1 | 4/2014 | Tunnell et al. |
| 2014/0164475 A1 | 6/2014 | Gargiulo |
| 2014/0214640 A1 | 7/2014 | Mallikarjunan et al. |
| 2014/0297520 A1 | 10/2014 | Levchin et al. |
| 2015/0088756 A1 | 3/2015 | Makhotin et al. |
| 2015/0310430 A1 | 10/2015 | Goldstone |
| 2015/0327072 A1 | 11/2015 | Powell et al. |
| 2015/0332262 A1 | 11/2015 | Lingappa |
| 2016/0104133 A1 | 4/2016 | Davis et al. |
| 2016/0104154 A1 | 4/2016 | Milov et al. |
| 2016/0183033 A1 | 6/2016 | Pogorelik et al. |
| 2016/0239842 A1 | 8/2016 | Cash et al. |
| 2016/0247156 A1 | 8/2016 | Hwang et al. |
| 2016/0260084 A1 | 9/2016 | Main et al. |
| 2016/0328700 A1 | 11/2016 | Bortolotto et al. |
| 2016/0335620 A1 | 11/2016 | Lyons et al. |
| 2017/0017958 A1 | 1/2017 | Scott et al. |
| 2017/0024720 A1 | 1/2017 | Shah |
| 2017/0032351 A1 | 2/2017 | Burroughs, Jr. et al. |
| 2017/0041389 A1 | 2/2017 | Smith et al. |
| 2017/0169408 A1 | 6/2017 | Vaananen |
| 2017/0193468 A1 | 7/2017 | Chougule et al. |
| 2017/0236118 A1 | 8/2017 | Caracey |
| 2017/0249622 A1 | 8/2017 | Ortiz et al. |
| 2017/0262841 A1 | 9/2017 | Good et al. |
| 2017/0286944 A1 | 10/2017 | Brown |
| 2017/0323297 A1 | 11/2017 | Shanmugam |
| 2017/0372275 A1 | 12/2017 | Sigmund |
| 2018/0018660 A1 | 1/2018 | Gomes et al. |
| 2018/0107992 A1 | 4/2018 | Al-Bedaiwi |
| 2018/0121908 A1 | 5/2018 | Lin et al. |
| 2018/0150830 A1 | 5/2018 | Badal-Badalian et al. |
| 2018/0189777 A1 | 7/2018 | Grassadonia et al. |
| 2018/0225666 A1 | 8/2018 | Khan et al. |
| 2018/0232726 A1 | 8/2018 | Sherwin |
| 2018/0247033 A1 | 8/2018 | Mathew |
| 2018/0268399 A1 | 9/2018 | Spector et al. |
| 2018/0315051 A1 | 11/2018 | Hurley et al. |
| 2018/0349888 A1 | 12/2018 | Dao et al. |
| 2019/0087816 A1 | 3/2019 | Jamkhedkar et al. |
| 2019/0095607 A1 | 3/2019 | Howard |
| 2019/0130409 A1 | 5/2019 | Barbuto et al. |
| 2019/0370846 A1 | 12/2019 | Zha |
| 2021/0326877 A1 | 10/2021 | Goodwin et al. |

TRUST-BASED APPLICATION TO APPLICATION CONNECTIVITY

CROSS-REFERENCE TO RELATED APPLICATIONS

This application is a Divisional of U.S. application Ser. No. 15/830,547 filed on Dec. 4, 2017, which is a Continuation-in-Part of U.S. patent application Ser. No. 15/830,377 filed on Dec. 4, 2017, both of which are incorporated by reference herein in their entirety.

BACKGROUND

Commerce traditionally understood as "brick and mortar" has had long standing requirements for trust in transactions that may be met in a number of manners. However, specific to types of transactions that may occur in ecommerce, enabling trust is different not only in degree, but in kind. Much more than merely "doing something on the Internet," actual management and enabling of trust so as to then be able to "do things on the Internet" comprises a set of technical problems to which resolution, much innovation is directed. Items and scope of effort to provide functional ecommerce capabilities require specific solutions that do not exist, nor would such be required to exist, outside of an environment of ecommerce. It is a nature of these transactions within a computing environment that drives large scale innovation efforts, including, for example, encryption. While encryption is one manner of ensuring a trust based system, other innovative avenues may also be pursued.

Wireless communication devices interconnected through a wireless personal area network, e.g., Bluetooth, Near Field Communication (NFC) technologies can communicate to other wireless portable devices. These wireless technologies typically require a user, through the user's device, to set up a paired connection with a remote device before the devices can exchange information. Setting up this connection may utilize an authentication phase, whereby the user may be requested to enter a password or personal identification number (PIN) to register the remote device in each device's table of paired devices. Similarly, mobile applications can communicate to each other using these wireless communication technologies. However, such wireless network does not enable payment to the connected devices in a secure manner.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The innovation disclosed and claimed herein, in at least one aspect thereof, includes systems and methods that enable secured transactions in ecommerce situations that do not have a parallel with traditional bricks and mortar commercial transactions.

In an embodiment, a system for enabling secured transactions may comprise a plurality of user computing devices, or user devices. The system, in some embodiments, may be comprised of a single computing device. In other embodiments of the innovation, the system may be comprised of multiple user computing devices, or multiple devices belonging to a user and to others. In embodiments, each user device may comprise at least one mobile wallet application that is associated with a mobile wallet server, as well as at least one ecommerce application.

A mobile wallet server may control backend processing of a trusted, or secure, transaction, and associations between mobile wallet applications and ecommerce applications may be mapped. Ecommerce applications associated with mobile wallet applications may be registered with at least one mobile wallet application. On a device, in which at least one ecommerce application is engaged by at least one mobile wallet application, the ecommerce application so engaged provides a payment request. The system also has a secure zone on the device that stores predetermined rules and mappings of the at least one mobile wallet application and the associated at least one ecommerce application.

The system in the embodiment also has an operating system extension, or "OSE," that may be configured to enable trusted transactions between the plurality of user devices without sharing a subset of backend financial data (or other secure/confidential data) to the at least one ecommerce application. Backend financial data is often a target of encryption or other methods in order to protect that data, and one avenue of innovation is to lessen impact of breaches of such measures by limiting sharing of data in the first place. It is to be appreciated that an embodiment may be concerned with a subset that is secured financial data associated with a user, and associated with the one or more mobile wallet applications.

In an embodiment, a configuration of an OSE may be independent of an operating system "OS" of a computing device, or device, and thus embodiments may be employed across multiple operating system environments. In another embodiment, a configured OSE may receive a payment request; may determine at least one master mobile wallet application from at least one mobile wallet application upon verifying at least a subset of predetermined rules and mappings located in a secure zone, and may send the payment request along with payment details to the at least one master mobile wallet application upon that determination. The configured OSE may also initiate an interaction between the at least one master mobile wallet application and a mobile wallet server, wherein the mobile wallet server may generate a payment confirmation message and a payment confirmation token. These generated items may be provided to the at least one master mobile wallet application that is associated with the payment request and the payment details. The configured OSE of the embodiment may receive the payment confirmation token and the payment confirmation message from the at least one master mobile wallet application and send the payment confirmation message and payment confirmation token to the ecommerce application, wherein the payment confirmation token permits the ecommerce application to process a goods or service offering associated with the payment request.

In some embodiments of the innovation, a configured OSE may further receive, from at least one ecommerce application in response to a payment confirmation message, a payment authorization request. The OSE may receive, from at least one master mobile wallet application, a payment authorization token; and may reconcile the payment authorization token received from a mobile wallet application with the payment authorization request received from the at least one ecommerce application. The reconciliation permits a funds transfer from the at least one master mobile wallet application to the ecommerce application without sharing a subset of backend financial data to the at least one ecommerce application.

In other embodiments of the innovation, a system may feature a mobile wallet application that is initiating a secured transaction with at least one ecommerce application as a thin-client mobile wallet application. The disclosed innovation provides that a thin-client mobile wallet application may be a mobile wallet application of more limited capabilities, but that may be associated with a master mobile wallet application residing on a separate one of the plurality of user device. The OSE on a user device with a thin-client mobile wallet application may be further configured to determine the computing device on which an appropriate master mobile wallet application resides, send a request for the OSE of the computing device on which the master mobile wallet application resides to continue processing a secured transaction. Such a request may trigger a message to the user associated with the master mobile wallet application. The request may indicate a number of details of the attempted transaction with the thin-client mobile wallet application; and upon receipt of an indication approving the request, the OSE of the computing device on which the appropriate master mobile wallet application resides may operate with the thin-client mobile wallet application to permit the at least one ecommerce application to process the goods or service offering.

The disclosed innovation provides that an example system may receive a payment confirmation token and a payment confirmation message from an at least one master mobile wallet application. An OSE in such an embodiment may further receive an approval through the master mobile wallet application, and that approval may be, at least in part, a result of an application of a set of rules determined by the OSE of the master-mobile-wallet-application-associated computing device, or a receipt of an approving reply to an instant message from a user associated with the master mobile wallet application, or both.

In another embodiment, a method for enabling secured transactions in ecommerce situations that do not have a parallel with traditional bricks and mortar commercial transactions is presented. Secure transactions may be between a user using a mobile wallet application on a computing device and at least one ecommerce application. A user may engage, on the computing device, an ecommerce application that has been registered with a mobile wallet application. The computing device may receive a payment request from the at least one ecommerce application, and an OSE may determine, through a set of predetermined rules, at least one master mobile wallet application. Upon verifying at least a subset of the preconfigured rules associated with at least one ecommerce application, the OSE may send, through the master mobile wallet application, at least the payment request to a mobile wallet server associated with the master mobile wallet application. The OSE, through the at least one master mobile wallet application and from the mobile wallet server, may receive a payment confirmation message along with a payment confirmation token. The OSE may send the payment confirmation message and payment confirmation token to the ecommerce application, wherein the sending permits the secured transaction to proceed; and upon completion of a provisioning of a product or service related to the ecommerce application payment request, the OSE may in turn receive a payment authorization request from the ecommerce application. The OSE, through the master mobile wallet application, may forward the payment authorization request to the mobile wallet server, and receive back, through the mobile wallet application, funds with which the OSE may resolve payment, through the mobile wallet application, with the ecommerce application.

In an embodiment, such resolution may be achieved wherein a backend processing by the mobile wallet server obtains and delivers funds without sharing a subset of sensitive data, associated with the user or with an owner associated with the master mobile wallet application, with the ecommerce application for the secured transaction.

In another embodiment, a method wherein a computing device, engaging at least one ecommerce application, need not comprise a master mobile wallet application, and instead may comprise at least a thin-client mobile wallet application. In such an embodiment, further method steps may comprise an OSE, of the device having the thin-client mobile wallet application, sending a request to at least one of a plurality of computing device associated with a master mobile wallet application so that an OSE of a computing device associated with the master mobile wallet is enabled to perform a disclosed method of the innovation. In this or similar embodiments, a further step of receiving a payment confirmation message may include an approval through the master mobile wallet application. Approvals through a master mobile wallet application may comprise approval through, at least in part; a set of rules determined by an OSE of the master-mobile-wallet-application-associated computing device, or an approving reply to an instant message from a user associated with the master mobile wallet application; or both.

Once a trust based system as disclosed is understood, aspects of the disclosed innovation may be leveraged to include a "Social Wallet" that may extend beyond direct ecommerce applications and with a focus to social network applications. Social Wallet may be able to adopt and adapt the ease and virility of social networks in order to expand the disclosed use of "trust." Rather than re-creating an entire network mechanism for which the Social Wallet could be spread and connections made, the ability is provided to engage in existing other social network applications and with the mobile wallet server and mobile wallet server database, determine a social wallet "reach" that the applications of using the disclosed trust mechanisms can be leveraged.

In an embodiment, a method of enabling secured transactions between a computing device within a wallet network and at least one ecommerce application may start with a first computing device that is registered with a mobile wallet application initiating a wallet network. That initiation may include the steps of an OSE of the first computing device indicating a plurality of social network applications on the first device, sending the indication to a mobile wallet server associated with the mobile wallet application, and receiving, from the mobile wallet server, a plurality of matches related to a subset of the plurality of social network applications, and registered users of the mobile wallet application. The OSE of the first computing device may send invites or notices or both to registered computing devices of the registered users of the matched wallet network and social application network. That OSE may receive acceptance of invites or notices or both that, upon receipt, initiates the establishing of an initial rule set that is applied to each of the accepting registered computing devices. The initial rule set may comprise established trust levels that permit a secured transaction to proceed. As the wallet network is initiated, a subset of the first computing device and accepting registered computing devices in the wallet network can engage the at least one ecommerce application that has been registered with a mobile wallet application, and backend processing by a mobile wallet server obtains funds without sharing a subset of sensitive data, associated with at least one of a user or owner associated with at least one device in the wallet network, with the ecommerce application for the secured transaction.

In another embodiment, a method of enabling secured transactions between a computing device within a wallet network and at least one ecommerce application is presented. The method may include a mobile wallet server receiving a wallet network initiation request from a first computing device that is registered with a mobile wallet application. The initiation of a wallet network may include a mobile wallet server receiving from an OSE of the first computing device, an indication of a plurality of social network applications on that device. The mobile wallet server may generate a plurality of matches related to a subset of the plurality of social network applications and related to registered users of the mobile wallet application, and may receive from the OSE of the first computing device acceptance of invites or notices or both that had been sent by the OSE of the first computing device to registered computing devices of the registered users of the matched wallet network and social application network. An initial rule set comprising at least in part established trust levels that permit a secured transaction to proceed is applied to each of the accepting registered computing devices. The mobile wallet server may receive an engagement request with the at least one ecommerce application that has been registered with a mobile wallet application. The request would be received from a subset of the first computing device and accepting registered computing devices in the wallet network, The mobile wallet server obtains funds through backend processing without sharing a subset of sensitive data, associated with at least one of a user or owner associated with at least one device in the wallet network, with the ecommerce application for the secured transaction.

In another embodiment, a non-transitory computer-readable medium configured to store instructions, that when executed by a processor, may perform operations including one or more of the system and method steps.

For these considerations, as well as other considerations, in one or more embodiments, a system for cloud service provisioning can include a memory to store computer-executable instructions and a processor, coupled to the memory, to facilitate execution of the computer-executable instructions to perform operations.

In another embodiment, a non-transitory computer-readable medium configured to store instructions, that when executed by a processor perform operations including cloud service provisioning.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
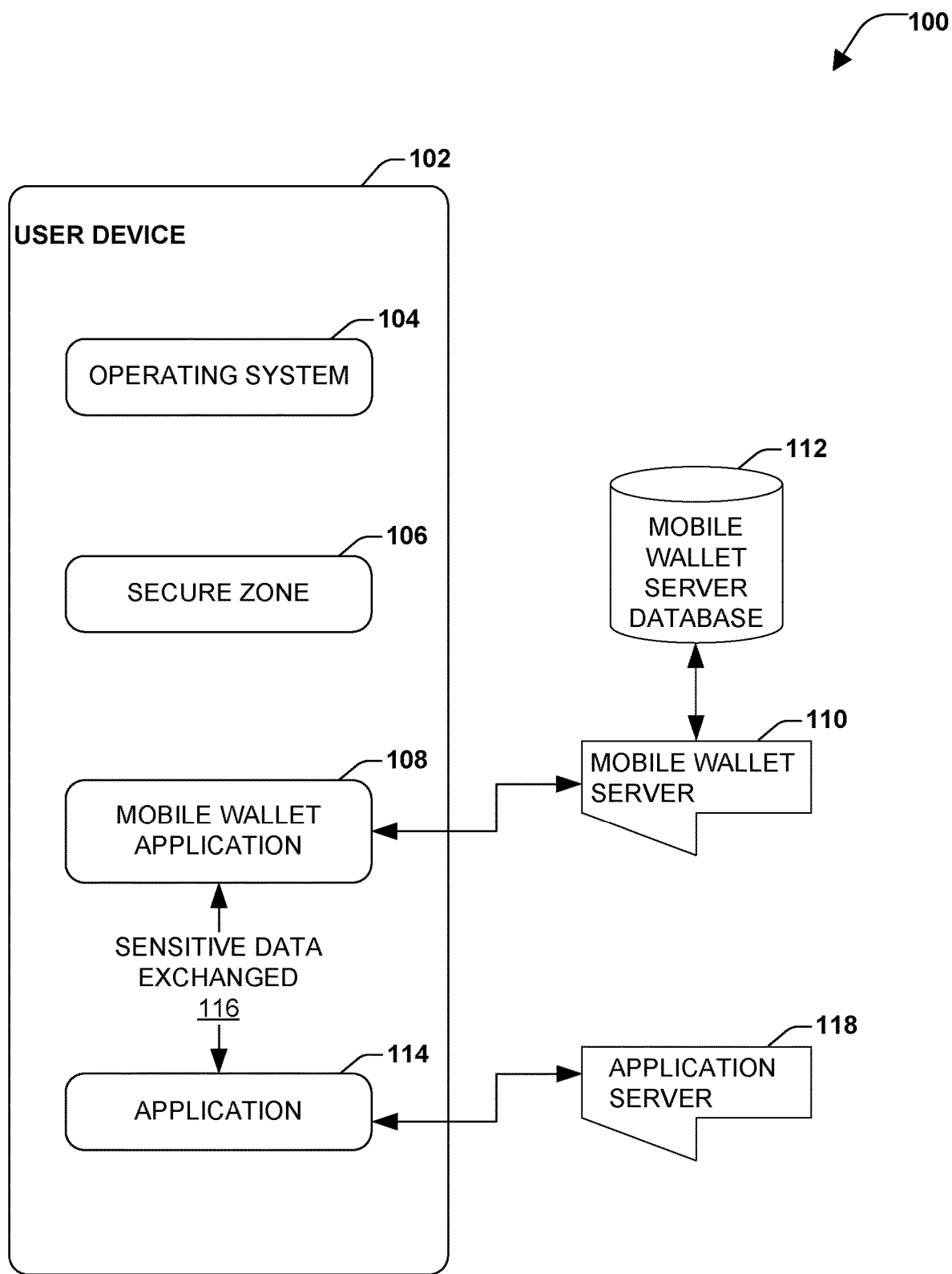
FIG. 1 is an illustration of a typical conventional configuration.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter can be implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the disclosed innovation as reflected in the claimed subject matter.

It is appreciated that embodiments are presented as a specific, non-limiting, examples of the innovation. Other embodiments are contemplated as well and intended to be included within the scope of this disclosure and claims appended hereto.

With reference now to the figures, FIG. 1 is an illustration of a typical conventional configuration. As may be recognized in the art, user device 102 may have an operating system 104, and a secure zone 106 within the user device 102. User device 102 may also have a mobile wallet type application 108. Such a mobile wallet application 108 may be coupled to a mobile wallet server 110 and the mobile wallet server may include a database 112 for information related to the mobile wallet application. Also on user device 102 may be an application 114. Application 114 may be an ecommerce application. It is to be appreciated that in conventional implementations, exchanges between a mobile wallet application 108 and an application 114 would typically include an exchange of sensitive data 116. The application 114 may be coupled to its own application server 118. Sensitive data may be exchanged from application 114 to application server 118, and exit control from a user of mobile wallet application 108. While attempts to protect sensitive data may be put in place (for example, encryption during transfer), the fact of the matter is that sensitive information is exchanged with an application and then is exported outside of user device 102 to at least application server 118. External forces, as has been illustrated in the recent news, reveal that such servers and other locations of sensitive information may be open to breach, and even though measures of trust may be put in place during a transaction, post transaction concerns may exist and rightly so.

As will be discussed herein in relation to at least FIGS. 2-7, what this disclosed innovation provides is a different approach to a "trust" (or secure) issue in an environment of computing devices involved in ecommerce (or other secure data transfer environments), rather than solely engaging in encryption and transferring sensitive financial information from one controlled data store to a data store of an ecommerce application for provision of some goods or services, thereby putting sensitive information into the cloud and to a vendor that itself may later suffer a loss of security and thus comprising sensitive financial information. The innovation may alleviate that level of effort by instead controlling sensitive financial information, either locking that information to a specific computing device secure location, or leaving the information secure on a controlled mobile wallet server (to be discussed in relation to FIG. 2). Through a computing device Operating System Extension (herein ("OSE") component, applications (e.g., third party applications) may be registered with a controlling mobile wallet application, and backend transfer of funds, based on sensitive information, may occur outside a range of what ecommerce applications see, and exchanges, first of a payment confirmation token and then, at a time of payment, a payment authorization token or other suitable reconciliation process enables funds to be transferred from a mobile wallet application to an ecommerce application without the ecommerce application seeing sensitive financial information.

Figure 2:
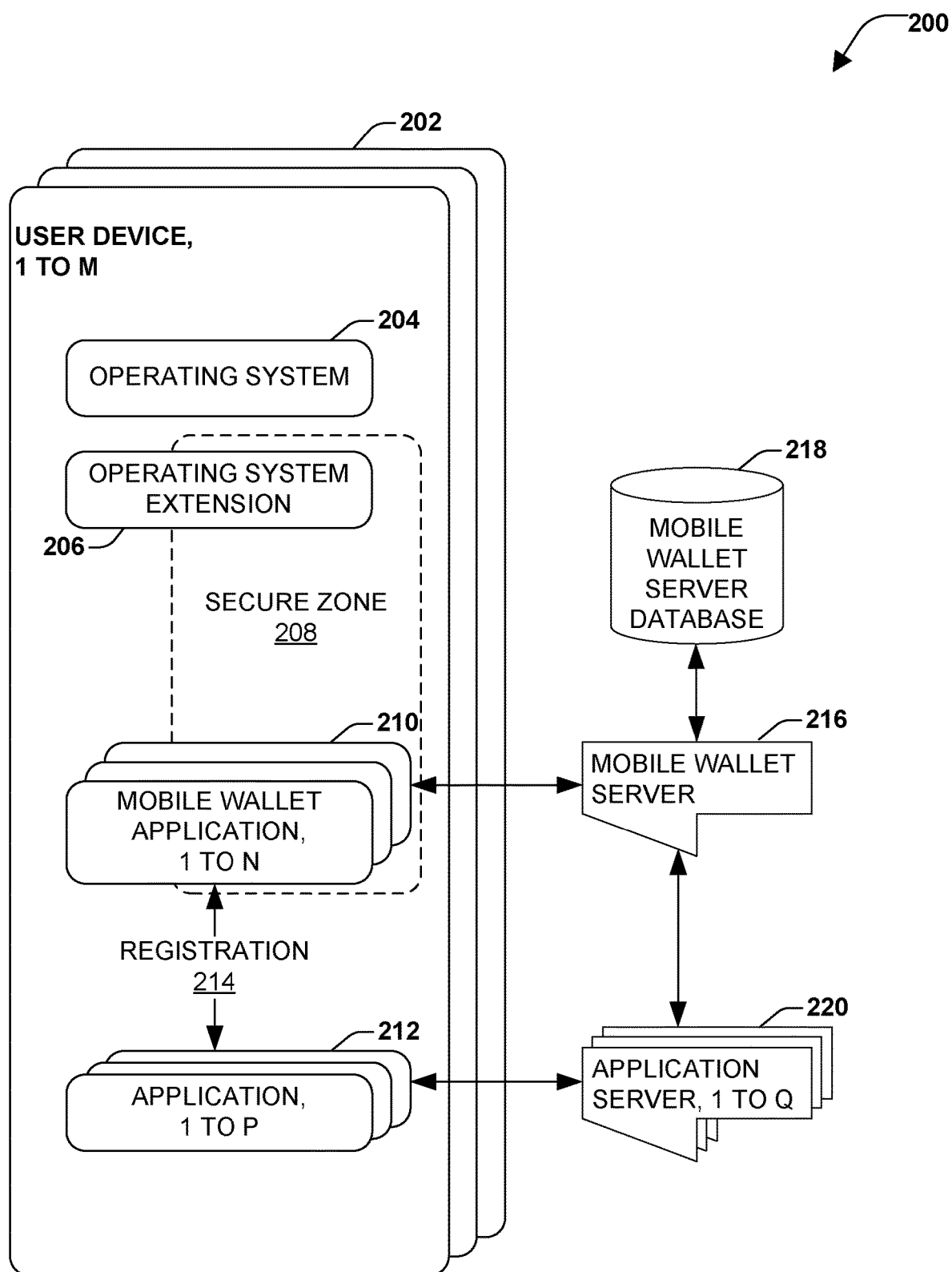
FIG. 2 is an illustration of example system components, according to one or more embodiments.

Turning now to FIG. 2, illustrated are example system components of the disclosed innovation, according to one or more embodiments 200. A system according to an embodiment of the innovation may be comprised of a plurality of user device, user device 1 to M 202, where M is an integer. User devices may be smart phone, tablet, laptop, watch, IOT (Internet of Things device) or computing devices of the like and may be capable of connecting with other components or devices via a network, such as the Internet. User devices may also be capable of pairing with proximity devices to enable wireless transaction without using credit/debit cards, as will be discussed later in relation to FIG. 4.

While it is to be appreciated that user devices 1 to M 202 may be equipped with their own native operating system 204, the innovation introduces a novel Operating System Extension 206 herein ("OSE"). The disclosed innovation provides that OSE 206 may be configured to interoperate with various operating systems 204 of various user devices 202 and thus provides a controlled operation of other features of the innovation regardless of a nature of operating system 204.

Further OSE 206 integrates and makes use of user device 1 to M 202's secure zone 208. Secure zone 208 is a location on user device 1 to M 202 operating under heightened security control, and OSE 206 takes advantage of this heightened security to place a database of rules and mappings (not shown). Rules may include settings and configurations that enable multiple payment modes (for example, automatic and interactive or manual payment modes). OSE 206 may update a rules database with a registered application (for example one or more registered applications may comprise a subset of a plurality of application 1 to P 212), wherein such a subset of applications may support automatic payment alert/notification/requests based on one or more conditions/events associated with a payment transaction.

User Device 1 to M 202 may also have a plurality of mobile wallet application 1 to N 210, where N is an integer. Another aspect of the disclosed innovation is that subsets of a plurality of mobile wallet application 1 to N 210 may have different purposes and/or capabilities. A Mobile Wallet Application may be one of a plurality of mobile wallet applications. There may be a plurality of master mobile wallet applications as well as a plurality of non-master mobile wallet applications. A subset of non-master mobile wallet applications may include thin-client mobile wallet application. Thin-client mobile wallet applications may be configured and loaded on user computing devices of, for example, people associated with a master mobile wallet application on a different user device. For most any such devices then that have capability of network access, the innovation permits even devices lacking a master wallet application to engage in secure transactions.

Further, a master mobile wallet application and other mobile wallet applications may, through an OSE, have a set of predetermined rules associated with and controlling transactions, as well as may have a mapping of associated mobile wallet applications coupled with registered ecommerce applications. The disclosed innovation provides that through such an OSE, predetermined rules and mappings may be held local to a user computing device, in a computing device secure zone (as discussed herein).

Mobile wallet application 1 to N 210 may be coupled (or associated) with a mobile wallet server 216, which may include a mobile wallet server database 218. Mobile wallet server 216 is a service provider that enables payment and non-payment transactions for user devices. Mobile wallet server database 218 may store transaction and other details. Other capabilities of mobile wallet server 216 coupled with mobile wallet server database 218 may include: calendar application data and timed (or scheduled) payments, for example, bill payments such as utilities that occur on a timed interval, collecting data from other registered applications, for example, car selling applications, financial applications, hotel and travel applications, reward point aggregation from various applications, collecting meta-data from most all social network applications, prioritize wish list, and predictive analysis, including budget setting and setting expenditure limit setting such as for product shopping. It is to be appreciated that a scheduling application may be a calendar application or other application that may be a subset of application 1 to P 212 located on user device 1 to M 202 or may be in communicative connection with user device 1 to M 202 from a mobile wallet server 216, application server 1 to Q 220 or other source (not shown). Data indicating timing may be captured and stored in mobile wallet server database 218 or stored locally in memory (not shown) of user device 1 to M 202. OSE 206 may access or may be supplied a reminder from such scheduling data through a scheduling application and may trigger the transactions involving the trust aspects as disclosed herein.

Data, including rules and mappings may be provided from mobile wallet server database 218 and placed in secure zone 208 of user device 1 to M 202.

A plurality of applications 1 to P, where P is an integer, may be present on user device 1 to M 202. For this innovation, it is be understood that a registration 214 between mobile wallet application 1 to N 210 and application 1 to P 212 occurs, and details and mapping of the registration may be placed in secure zone 208 as well as in mobile wallet server database 218 (registration will be discussed herein). Application 1 to P 212 may also be coupled with application server 1 to Q 220, where Q is an integer. A subset of the plurality of application servers 1 to Q 220 may be most any servers for example, third party servers including, but not limited to, Flipkart, Amazon, Expedia, Make my trip, Telephone service providers, and the like. A plurality of application servers 1 to Q 220 may be coupled with user device 202 via a network, for example, the Internet (not shown).

A plurality of applications 1 to P 212 may include a subset of non-ecommerce applications. For example, a subset may be social media applications, calendar applications and other applications that may facilitate payment and non-payment transactions for a user of user device 1 to M 202. For further example, a subset may be applications that integrate a user calendar or schedule of events that synchronizes with at least a subset of mobile wallet application 1 to N 210 and rules and mappings stored in the secure zone 208 by OSE 206. Examples of such applications may include a reminder scheduler on a calendar app/reminder app, as may be provided on smart phones, an event reminder and payment triggering module, an event/invite monitor interface on a smartphone or other user devise that tracks events such as birthdays, anniversaries, social invites and the like. It is to be appreciated that such other devices may be extensive and may include receipt of input from most any item that may be characterized as "the Internet of Things" or "IOTs."

OSE 206 may process data by rules and mappings stored in secure zone 208 or in addition or alternatively may receive updates from mobile wallet server 216. Mobile wallet server 216 may employ data aggregation APis/edge analytics and push notifications to an event reminder module (not shown) on user device 1 to M 202. Edge analytics may look into relationship status, latest address or other details from social media, phonebook and contact data for additional information that may be related to ecommerce application processing (for example, retrieval of a shipping address for a purchased product tagged as a birthday gift).

A further example of an application in a subset of non-ecommerce applications, of applications 1 to P 212, may include a messaging module that may record I store I send messages to intended recipients as per rules in secure zone 208. Such rules may include a reminder set in an event monitor, and the disclosed innovation provides that a recorded message may be a user's voice, a user's video, an SMS text, an Email, a twitter message, a Facebook posting, or the like.

Registration 214 also encompasses registering a plurality of mobile wallet application 1 to N 210 with a particular of user device 1 to M 202 upon which the plurality of mobile wallet application 1 to N 210 resides, and this registration data may be stored in mobile wallet server database 218. The registration permits the services of mobile wallet server 216 to be engaged by user device 1 to M 202. Registration and the mobile wallet server database 218 also enable a determination that at least one rule or mappings on user devices connecting via a mobile wallet server 216 have updated rules and mappings available. An OSE 206 of a user device 202 may determine that at least one of a plurality of mobile wallet application 1 to N 210 may have rules or mappings to be updated, and obtain such updates and store the updates in a secure zone of an OSE related device.

Update capability may also be enacted in an example embodiment in which a subset of a plurality of mobile wallet applications is added to a device already including at least one mobile wallet application. In such a case, the OSE of the device with the at least one mobile wallet application interacting with a mobile wallet server 216 and a mobile wallet server database 218 would identify a changed mapping (e.g., via a mapping monitor component (not shown)) on the device, update the mapping and (e.g., via a mapping update component (not shown)) store the updated mapping (e.g., via a mapping storage component (not shown)) in a secure zone 208 of the device and in the mobile wallet server database 218. It is be appreciated that such changes to a plurality of mobile wallet application as well as changes to a plurality of application 1 to P 212 are tracked and maintained to reflect applications on user device 1 to M 202.

The disclosed innovation provides that mobile wallet server 216 may in some embodiments be coupled directly to the plurality of application server 1 to Q 220.

Activities related to backend processing between mobile wallet applications and location of funds may occur between a mobile wallet server and a secure funds server (not shown), and thus would remain outside of the interaction that ecommerce applications are involved with, lessening a desire for encryption or other measures between a computing device user and vendors of ecommerce goods and services.

Figure 3:
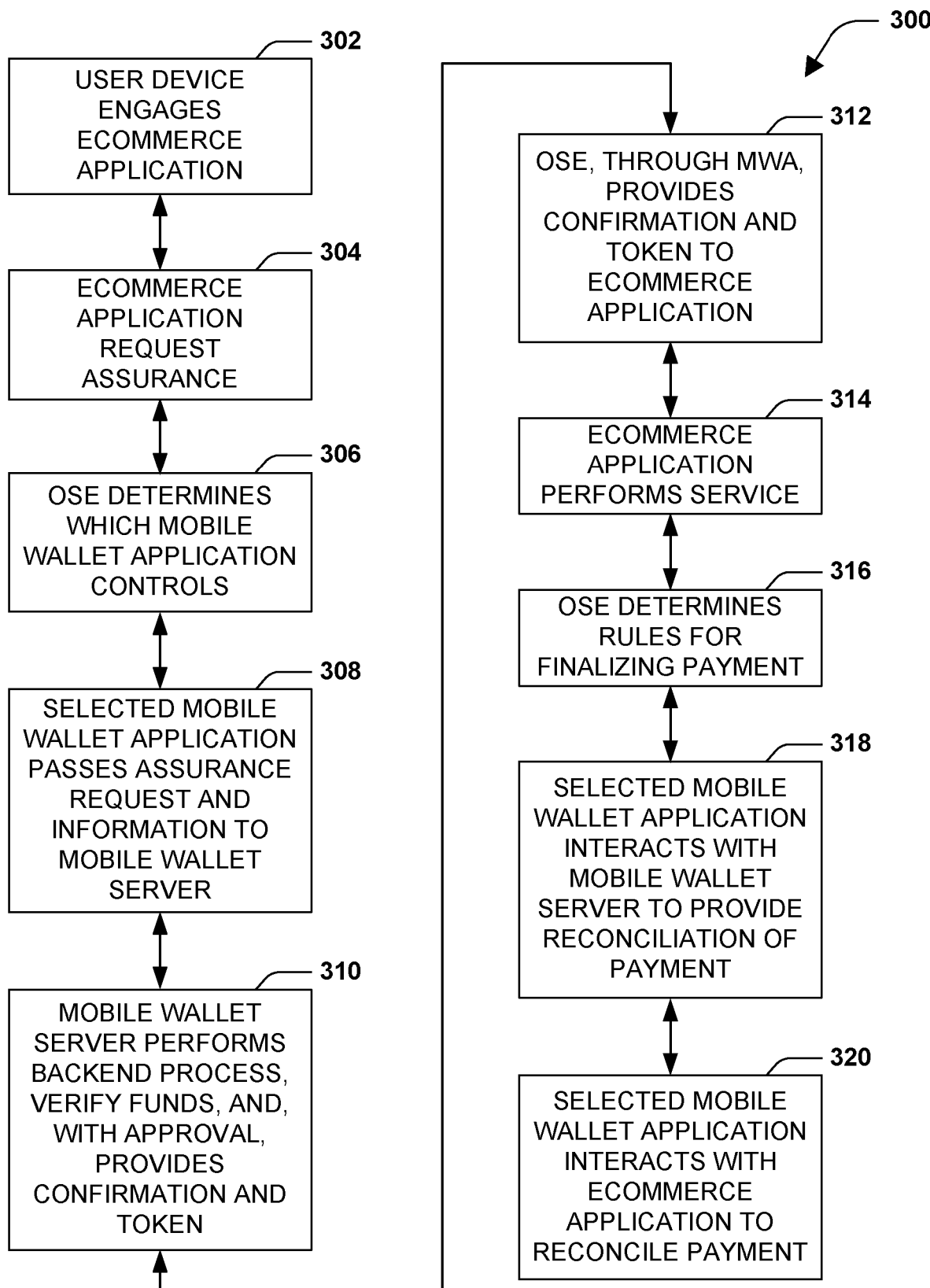
FIG. 3 is an illustration of example method, according to one or more embodiments.
Figure 4:
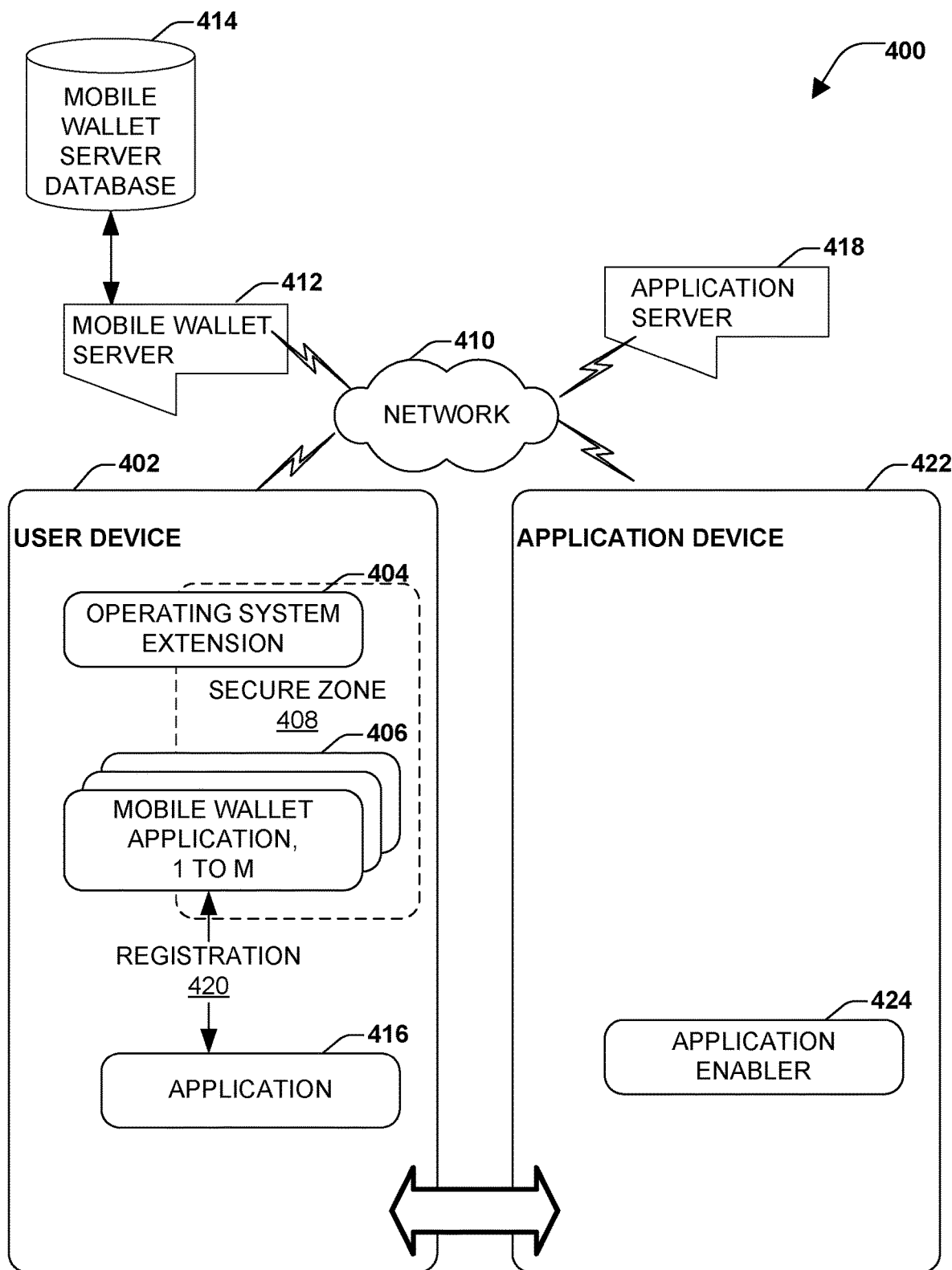
FIG. 4 is an illustration of an example interaction 400 in accordance with one or more aspects of the disclosed innovation.
Figure 5:
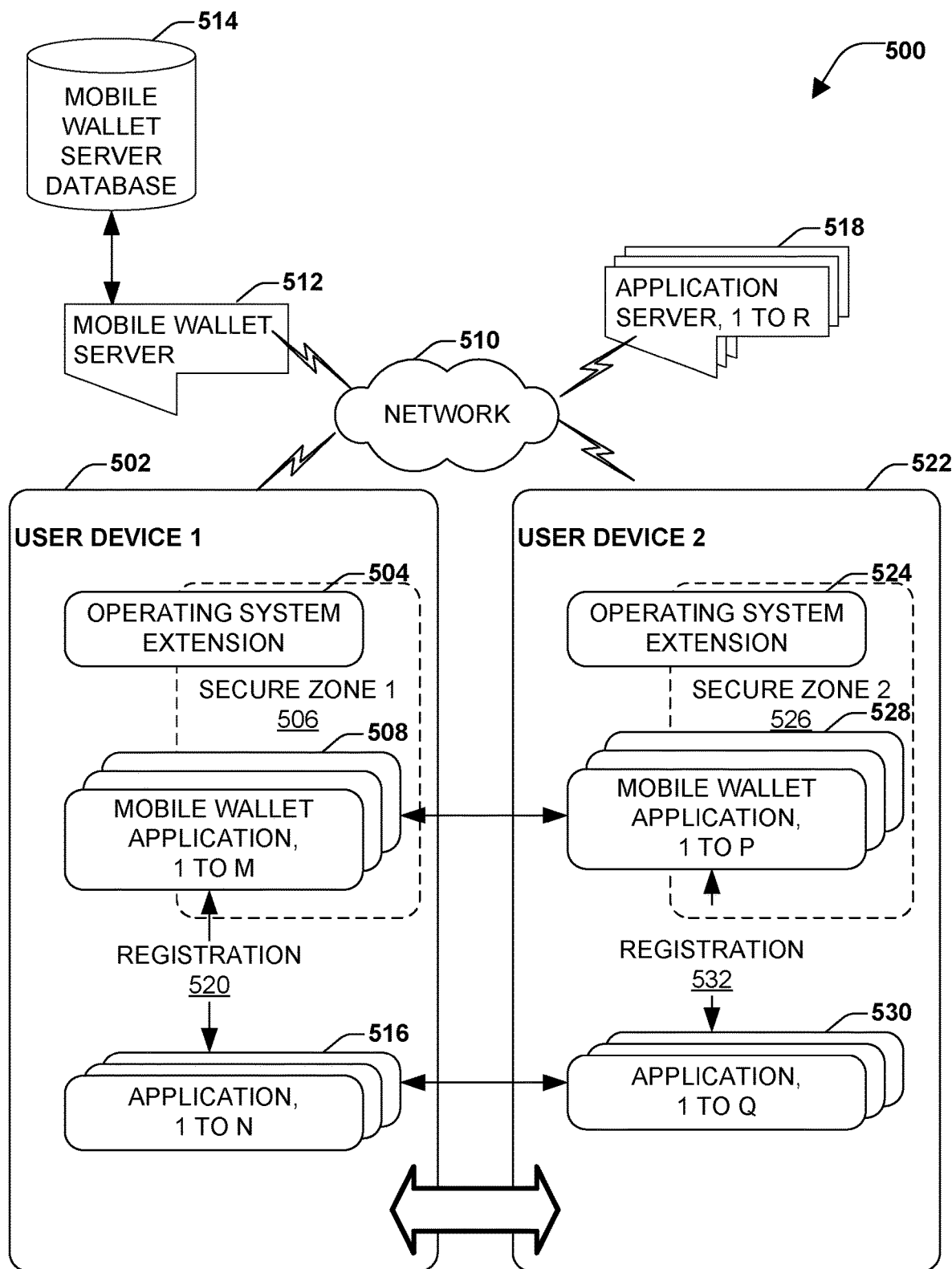
FIG. 5 is an illustration of an example interaction 500 in accordance with one or more embodiments of the disclosed innovation can be implemented.

Turning now to FIG. 3, illustrated is an example method 300 according to one or more embodiments. The example method may engage a system as described in system 200, and shown in FIG. 2. Likewise, aspects of an example method may be reflected in the interactions 400 and 500, as shown in FIGS. 4 and 5, to be discussed later. Example method may begin at step 302, wherein a user device, such as user device 1 to M 202 of system 200, may engage in a transaction with an ecommerce application, such as a subset of application 1 to P 212 of system 200, through an ecommerce environment.

Transactions may be to obtain some product or service. Other transactions that may be dependent on a secure or trusted connection are also contemplated and may fall under the use of the term "obtain service." It is to be appreciated that the term ecommerce application, application, third party application and the like may be used interchangeably, or may be associated with an ecommerce environment as the context of the use of the term makes clear.

Beginning at step 302, it is to be understood that the user device, the plurality of mobile wallet application and the plurality of application, such as user device 1 to M 202, mobile wallet application 1 to N 210 and application 1 to P 212 of system 200, have each been registered with a mobile wallet server, such as mobile wallet server 216 of system 200. At step 304, the ecommerce application engaged by the user device may request assurance. The requesting of assurance may take several forms, from a request for payment, an inquiry as to payment capability, a verification of the same, or an identity request and the like. Since the ecommerce application has been registered with a user mobile wallet application, such as a mobile wallet application 1 to N 210 of system 200, and a mapping between the two, along with related information, is kept secure in a user device secure zone, such as secure zone 208 of system 200, the ecommerce request may be handled without a transfer of secure financial information from a user to the ecommerce application.

In this example, it is to be appreciated that most all such requests prior to the innovation disclosed herein would involve handling and transfer of secure and sensitive data. Upon receipt of the assurance request by an OSE, such as OSE 206 of system 200, the OSE may determine, verify, and select, by using predetermined rules and mappings located in a secure zone, which of a plurality of mobile wallet application controls processing with a particular ecommerce application for a particular event. The disclosed innovation provides that a pre-determined rule set allows for a great variety of conditional controls and actions between a plurality of mobile wallet applications. It is also to be appreciated that the plurality of mobile wallet application may include mobile wallet applications of various capabilities (as was discussed in relation to FIG. 2 and will be further discussed later in relation to FIG. 5).

At step 308, the selected mobile wallet application passes along the assurance request and related information to a mobile wallet server, such as mobile wallet server 216 of system 200. Information may be related to a purchase of goods or services from the ecommerce application, or may be of other transactions dealing with sensitive information. At step 310 the mobile wallet server performs backend processes, including, but not limited to verifying funds with funds providers, and, with approval (as may be denoted by rules within secure zone as controlled by device OSE, or as rules may permit, an OSE of a separate device, as will be discussed later in relation to FIG. 5), the mobile wallet server generates a confirmation message and confirmation token.

At step 312, the OSE through the selected mobile wallet application provides the confirmation and token to the ecommerce application. Upon receipt, the ecommerce application performs service at 314. The disclosed innovation provides that by "performing service," it is contemplated that service may be a provisioning of goods, services (actions) or other transaction as previously noted. After (or in some embodiments, during) step 314, the OSE, at step 316 determines rules for finalizing payment.

While not specifically illustrated, in another embodiment, rules and mapping in OSE may provide limited permission to an ecommerce application to partially perform once a confirmation token is received, but not commit to a full action or completion of service until a separate approval step has been reached. This may reflect the embodiment mentioned above in which step 316 occurs during step 314. In such an embodiment, ecommerce application performance may reflect levels predetermined and set at a registration sub-step inherent in step 302 referenced earlier.

At 318 the selected mobile wallet application may interact with a mobile wallet server to provide reconciliation of payment, and at step 320 the OSE, through the selected mobile wallet application, interacts with the ecommerce application to reconcile payment, and the OSE updates transaction details respectively. Another aspect of the innovation is that the reconciliation may center around an exchange of tokens and confirmations, or in some embodiments a transfer of funds from a mobile wallet server, such as mobile wallet server 216 of system 200 directly to an application server, such as application server 1 to Q 220 of system 200. The reconciliation occurs without sharing at least a subset of sensitive financial information during the entire process between the mobile wallet system (server, database and plurality of mobile wallet application) and the ecommerce application systems. The disclosed innovation provides that funds transfer may be through most any number of manners controlled by the predetermined rules.

FIG. 4 is an illustration of an example interaction 400 in accordance with one or more aspects of the disclosed innovation. The interaction 400 is an illustration of an example interaction of a device to device interaction between a user device 402 and an application device 422. Application device 422 may comprise an application enabler 424. Application enabler 424 may be most any component that interacts with application 416 on user device 402. It is to be appreciated that details of application device 422 are left at a high level of discussion, as many application devices are contemplated to be able to be accommodated by the disclosed innovation. User Device 402 may be as described earlier in relation to FIG. 2, such as being one of a plurality of user device 1 to M 202, named items in FIG. 4 being similar to like named items in FIG. 2. While some elements are not pictured for clarity, what is shown in this embodiment is not to be considered limiting on its own, and that this and other embodiments may share features and capabilities discussed individually.

As illustrated with a bidirectional arrow, user device 402 may connect directly with application device 422. Application device 422, with application enabler 424 may handle interactions with application 416 on user device 402. System 400 may employ a secure process and interaction between a mobile wallet application 1 to M 406 and an ecommerce application 416 similar as to disclosed and discussed in relation to FIG. 3. FIG. 4 highlights an aspect of the innovation in that improved trust or secure transactions may be employed within a system as reflected in system 200, or in an interaction, such as in interaction 400, in which a separate application device is in communication with user device 402. In outward appearances, this may be similar to many "tap and pay" or other ecommerce transactions, but with the innovative aspect of a transaction being completed without sensitive secure information related to a mobile wallet application 1 to M 406 being shared with an application 416, an application device 422, an application enabler 424 or an application server 418. Additionally, hardware processing capabilities, for example, speed of identified registration data transfer or speed of transactions, may be improved and the innovative reduction in breach concerns for all parties involved provides a material benefit.

Turning to FIG. 5, another aspect of the disclosed innovation is presented. Another aspect of the disclosed innovation is that the example interaction as discussed in the embodiment in relation to FIG. 5 may be reflected in a method, such as method 300 of FIG. 3, or may reflect components of a system, for example system 200 of FIG. 2. The example interaction of FIG. 5 illustrates how a plurality of user device may operate in tandem in order to provide ecommerce transactions without sharing of at least a subset of users sensitive secure information from sets of mobile wallet applications 1 to M 508 and sets of mobile wallet applications 1 to P 528 with sets of plurality of application 1 to N 516 and plurality of application 1 to Q 530, or with a plurality of application server 1 to R 518. Specifically, FIG. 5 illustrates an aspect of the disclosed innovation in regards to the ability to use a thin-client mobile wallet application (as a subset of mobile wallet application 1 to M 508) located on user device 1 502 in conjunction with a use of a master mobile wallet application (as a subset of mobile wallet application 1 to P 528 on user device 522 in order to engage an ecommerce application (for example, a subset of application 1 to N 516) on user device 1 502 to engage a secure or trusted ecommerce transaction specifically in a ecommerce environment.

User device 1 502 and user device 2 522 may be as described earlier in relation to FIG. 2, such as each user device being one of a plurality of user device 1 to M 202, named items in FIG. 5 may be similar to like named items in FIG. 2. While some elements are not illustrated for clarity, what is shown in this embodiment is not to be considered limiting of itself, and that this and other embodiments may share features and capabilities discussed individually. As pictured with a bidirectional arrow, user device 502 may connect directly with user device 522.

Aspects of the disclosed innovation provides that the devices, the mobile wallet applications, and the applications are all each registered with mobile wallet server 512, and that mapping of devices, plurality of mobile wallet application and registered applications are captured and stored in at least mobile wallet server database 514. Additionally, rules, data and mappings related to mobile wallet application 1 to M 508 and plurality of application 1 to N 516 are located in secure zone 1 506. Similarly, rules, data and mappings related to mobile wallet application 1 to P 528 and plurality of application 1 to Q 530 are located in secure zone 2 506. Another aspect of the disclosed innovation is that mobile wallet server database may coordinate at least one of mobile wallet application 1 to M 508 with at least one of mobile wallet application 1 to P 528.

In an embodiment, mobile wallet application 1 to M 508 need not contain a master mobile wallet application. In this embodiment, for example, user device 1 may belong to a child, and the mobile wallet applications of mobile wallet application 1 to M may be of limited capabilities. In this same embodiment, User device 2 522 belongs to a parent, and one of the mobile wallet applications 1 to P 528 is an associated master mobile wallet application which by predetermined rules located respectively in each device (and in mobile wallet server database 514) control the thin-client mobile wallet application. By working in conjunction, user device 1 may still engage with ecommerce applications, but with control as set by predetermined rules located at least in secure zone 1 506, and thus approval and processing of engaging ecommerce applications, for example, in a method 300 as discussed in FIG. 3 may occur, but subject to rules in user device 1 and rules in user device 2. An embodiment discloses an ability to operate device to device provides that wherein only one device may have an ecommerce application, but includes a mapping in that first device, control may propagate through the mapping, to related mobile wallet applications, even mobile wallet applications on different devices.

Referencing the method as discussed in FIG. 3, the following example (not shown in its own figure) illustrates how such a method may be undertaken by example interaction such as example interaction 500 of FIG. 5. In this embodiment, an example method may begin as at step 302, but here, a first user device, user device 1 502, may engage in a transaction with an ecommerce application, such as a subset of application 1 to N 516, through an ecommerce environment. At step 302, it is to be understood that user devices (both user device 1 502 and user device 522), plurality of mobile wallet application (both mobile wallet application 1 to M 508 and mobile wallet application 1 to P 528) and plurality of application (both application 1 to N 516 and application 1 to Q 530), have each been registered with a mobile wallet server, such as mobile wallet server 512. At step 304, the ecommerce application engaged by the user device may request assurance.

It is to be appreciated that the requesting of assurance may take several forms, from a request for payment, an inquiry as to payment capability, a verification of the same, or an identity request and the like. Since the ecommerce application has been registered with a user mobile wallet application, such as a thin-client mobile wallet application (a subset of 1 to M 508), and mappings between each, along with related information, are kept secure in a user device secure zone, such as secure zone 1 506 as well as mobile wallet server database 514, the ecommerce request may be handled without a transfer of secure financial information from a user to an ecommerce application. Upon receipt of the assurance request by user device 1 502, OSE 504 may determine, verify, and select, by using predetermined rules and mappings located in the secure zone 1 506, which of a plurality of mobile wallet application controls the process of dealing with a particular ecommerce application for a particular event.

Pre-determined rule sets allow for a great variety of conditional controls and actions between the plurality of mobile wallet application. In this embodiment, rules in secure zone 1 506 indicate that a master mobile wallet application (one of mobile wallet application 1 to P 528) is the selected mobile wallet application for the transaction. Upon rules determination, such an assurance request may trigger a message to a user associated with the master mobile wallet application. In this embodiment, OSE 504 works with user device 2 522 and the OSE 524 of user device 522. The disclosed innovation provides that a multiple of master mobile wallet applications may be associated with the thin-client mobile wallet application and these multiple of master mobile wallet applications may exist on a number of user devices, but for the sake of discussion simplicity and not limitation, reference will be made to a single separate user device, user device 2 522. At step 308, the selected mobile wallet application passes along the assurance request and related information to a mobile wallet server, such as mobile wallet server 512. Related information may be, for example, related to a purchase of goods or services from the ecommerce application located on use device 1, and pertinent details and request are passed seamlessly from OSE 504 of user device 1 to OSE 524 of user device 522. At step 310 the mobile wallet server performs backend processes, including, but not limited to verifying funds with funds providers, and, with approval (as may be denoted by the rules within the secure zone 2 526 as controlled by user device 2 OSE 524), the mobile wallet server generates a confirmation message and confirmation token.

At step 312, the OSE 524 through the master mobile wallet application (one of mobile wallet application 1 to P 528) provides the confirmation and token to the ecommerce application through the thin-client mobile wallet application and OSE 504 of user device 1 502. Once the confirmation and token are received at the ecommerce application, the ecommerce application performs service at 314. The disclosed innovation provides that by "performing service," it is contemplated that the service may be a provisioning of goods, services (actions) or other transaction as previously noted. After (or in some embodiments, during) step 314, controlling OSE 524 of user device 2 in conjunction with subordinate OSE 504 of user device 1 502, at step 316 determines rules for finalizing payment.

As in method 300 of FIG. 3, in an embodiment, controlling OSE 524 of user device 2 in conjunction with subordinate OSE 504 of user device 1 502 may provide limited permission to an ecommerce application to partially perform once a confirmation token is received, but not commit to a full action or completion of service until a separate approval step has been reached. This may reflect the embodiment mentioned above in which step 316 occurs during step 314. In such an embodiment, ecommerce application performance may reflect levels predetermined and set at a registration sub-step inherent in step 302 referenced earlier.

At 318 master mobile wallet application may interact with mobile wallet server 512 to provide reconciliation of payment, and at step 320, OSE 524, through the master mobile wallet application, and through thin-client mobile wallet application and OSE 504 of user device 1 interacts with the ecommerce application to reconcile payment, and both OSE 504 and OSE 524 update transaction details respectively. The disclosed innovation provides that reconciliation may center around an exchange of tokens and confirmations, or in some embodiments a transfer of funds may be direct, as from a mobile wallet server, such as mobile wallet server 512 directly to an application server, such as application server 1 to R 518. The reconciliation occurs without sharing at least a subset of sensitive financial information during the entire process between mobile wallet system (server, database and plurality of mobile wallet application) and ecommerce application systems. Another aspect of the disclosed innovation is that funds transfer may be through most any number of manners controlled by predetermined rules.

Turning now to the series of FIGS. 6-11, aspects of the disclosed innovation are presented. Aspects may include initiating a "Social Wallet" type of network that may leverage the "trust" factors established in regards to ecommerce applications by adopting and adapting functionality of one or more social network applications. It is to be appreciated that the terms "Social Wallet," "social wallet network", and "wallet network" are used interchangeably. Leverage of adoption and adaptation may apply the "trust" aspects in an expanded reach of connectiveness. It is to be appreciated that with this expanded reach, additional rules and defaults may be established and be contained in a mobile wallet server (and a mobile wallet server database), for example mobile wallet server 810, 910, and 1010 and mobile wallet server database 814, 914, and 1014 of examples 800, 900, and 1000 respectively. As with previous discussions of rules, these may also be contained locally to involved device OSEs. These expanded rules and defaults may enable multiple master wallet configurations and configurations in which a thin wallet application may be able to process the disclosed secure transactions. In addition to default or predetermined rules, it is to be appreciated that "on the fly" negotiations between multiple masters associated with a thin client mobile wallet application are considered to be part of this disclosure.

In a wallet network, users and connections of the network may adopt and adapt social network application connectivity and levels. This may include levels of friends (close, long distance, acquaintances) as well as ecommerce (business to business, vendor/supplier, preferred business partner) and other types of social network connections. With adopting and adapting aspects of social network applications and creating a wallet network, opportunities for financial transactions of numerous electronic connection types may be made available and be undertaken in the established trust aspects of the disclosed innovation without building a separate social network application platform. With a wallet network, extended financial transactions with trust as disclosed earlier, can be enabled between groups of users along a wider variety of most any type of group that may form, from groups of family members to groups of business interactions or other societal concerns. As discussed earlier, the OSE of devices with mobile wallet applications may handle financial transactions within such a group between devices of group members, between applications within a device, and between applications of different devices with invite capability. An OSE is capable of enabling modifications of rules and policies (as may be captured in a mobile wallet server database, for example), and may provide for updated visibility of a wallet network in a mobile wallet application.

Figure 6:
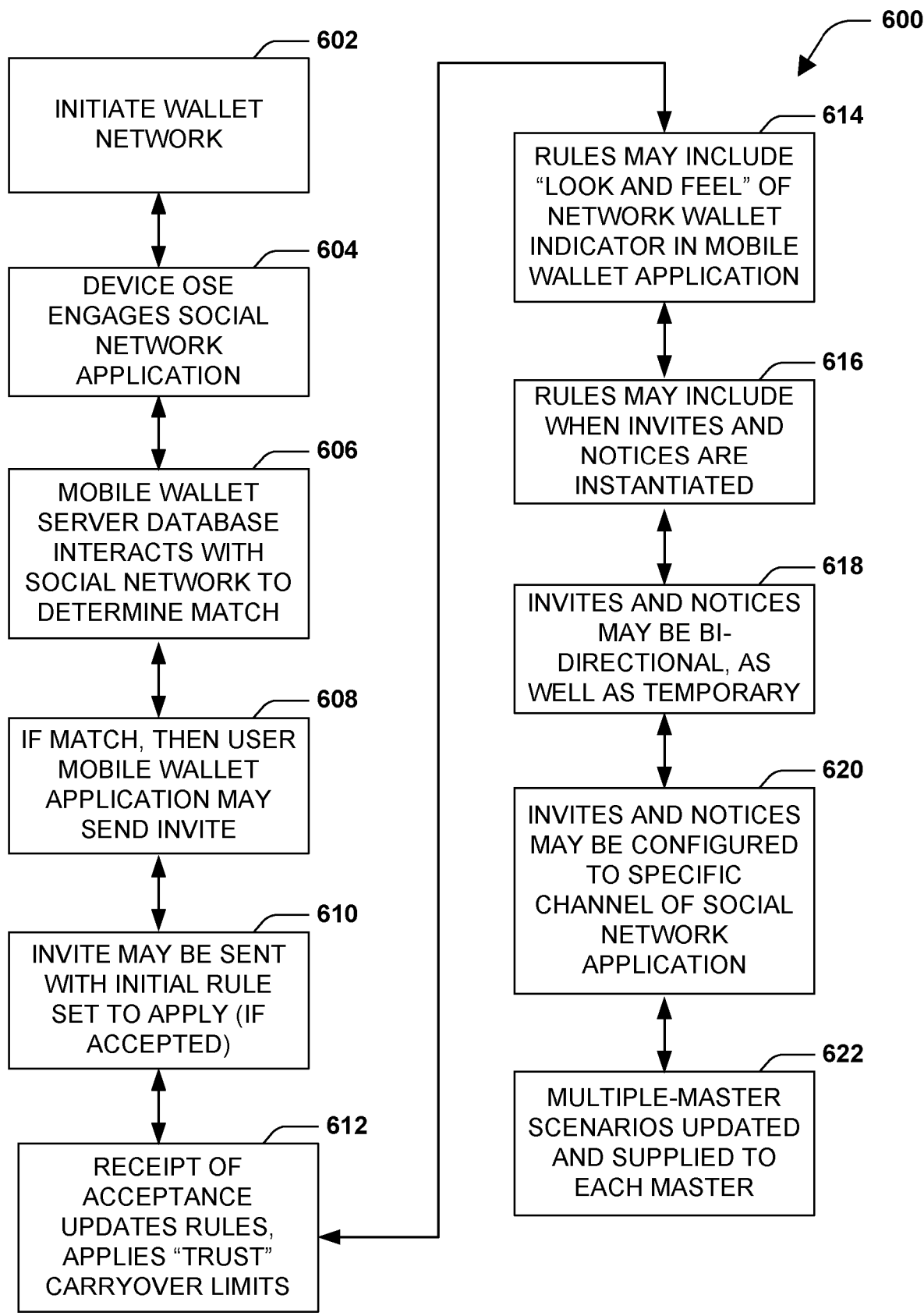
FIG. 6 is an illustration of an example method 600, according to one or more embodiments.

Turning to FIG. 6, an example method of a wallet network is portrayed. At 602 a user device with one or more mobile wallet applications (which may be a mobile master wallet application or a thin-client mobile wallet application) initiates a wallet network. A device OSE may be associated with a mobile wallet server, for example a mobile wallet server 216, and a data store from the mobile wallet server database, for example mobile wallet server database 218, as discussed in FIG. 2.

At 604, an OSE may indicate one or more particular social network applications on a device. With these a mobile wallet server may determine match connections those on the particular social networks that also may be a member of a mobile wallet community at 606. If a match does exist, at 608, the OSE of the user device may send out invites or notices or both to members of both the wallet network and of the social media network. If a match does not exist, an embodiment may send an invitation to a selected wallet network or social network member to join a social network or conversely a mobile wallet application. These choices may be preselected, or selected on the fly. If there is a match (or an accepted invitation to join), the user mobile wallet application sends an invite to the recipient to join a wallet network at 608. At 610, the invite may contain an initial rule set to apply to each of the connecting user devices to which invites or notices have been sent and accepted.

An initial rule set may contain rules and settings for a variety of factors. For example, the receipt of the invite may update the rules and "trust" carryover limits as may be reflected and stored as disclosed previously 612. At 614 the initial rule set may control a look and feel of the social wallet (if accepted) that may appear in any of the plurality of mobile wallet applications of the members of a wallet network (including in some embodiments an indicator as to through which social network application the network wallet connection has been made). A person in a wallet network, upon opening one or more mobile wallet applications may be provided indicators (icons or such) of connections and the indicators may indicate a number of factors including common social networks and levels of "trust" or shared controls. Initial rule set may include how and when invites and notices are instantiated 616. Rules may be modified or updated, and may be conditional. For example, rules may be set to have limits, and limits may themselves be modified based on certain conditions (for example, a presence of a second master may alter rules dealing with a thin client mobile wallet application). Further, as discussed previously with notifications, dynamic negotiations of potential rule modifications may be possible in some embodiments. It is to be appreciated that invites and notices, once a connection has been established, may be bi-directional as well as may be of a temporary nature 618. By this, a temporary nature is meant to indicate that a connection between two users may be established in a mobile wallet server database for a limited duration (time or event driven) and may expire and be removed from a mobile wallet server database at a predetermined time interval or event. In this manner, it is envisioned that one or more master wallets may send invitations to an associated list that expire at a certain elapsed time and that "trust" may thus be a conditional state. For example, the relative permanence of any established connection, including temporary connections, may last only as long as a transaction. Disclosed methods, for example, method 300 as shown in FIG. 3 may be expanded beyond an ecommerce application and may include a social network application. It is to be appreciated that through various social network applications an opportunity to engage in commerce (person to person or otherwise) may arise, and the ability to engage in trusted transactions as discussed earlier may be undertaken.

It is to be appreciated that the look and feel may vary based on a number of factors, including the particular specific social network application channel (604), the initial default rules of interactions and controls (610), and any predetermined trust limits (612) as may be populated form the mobile wallet server database indicative of the relation between the two or more connecting entities. Overall, the adopting and adapting use of a social network application generated leverage of network connectivity to a wallet network 620.

Additionally, at 622, rules, both default and settings to allow on the fly negotiable rules may be provided as between multiple master wallet applications as well as setting up thin client applications as sharing more than one master wallet application.

Continuing with FIGS. 7 through 11, leveraging of a wallet network may be effected through a mechanism of a plurality of social network applications is shown. It is to be appreciated that in these example figures, multiple users are generally shown with their distinct user devices (for example, in FIG. 7, User 1 Device 1 702, User 2, device 2 716, through User M Device 1 720 and User M+1 Device 1 724), and each may signify different users each with their own device. For simplicity sake, only one device is pictured per user, but the disclosed innovation extends to multiple devices per user. Also for simplicity sake, the device is shown as limited to a wallet application (either a mobile master wallet application or a mobile thin wallet application, and devices may have a plurality of mobile wallet applications as discussed earlier. Also not pictured for the sake of clarity are the aspects discussed previously as to OSE and secure zones. These changes in presentation are merely for convenience sake, and user devices should be considered to be similar as to the discussions previously. Similarly, non-mobile wallet applications pictured per device are portrayed in the singular for simplicity sake only, and it should be appreciated that the applications may be a plurality of applications including ecommerce applications as well as social network applications, For embodiments discussed in conjunction with these figures, applications that may discussed as reflecting social network applications, but this is not a limitation on the disclosed innovation, and it presented as such for clarity purposes only. In the figures, the plurality of applications servers may be viewed as a plurality of social network servers (SN servers), and the particular user devices may be viewed as having (or as the case may be, invited to have) applications that are of the social network type (herein "SN applications").

As pictured in the example 700, users 1 to M, wherein M is an integer, each may have a device (702, 716, 720, and 724) that connects through a network 708 to each of a mobile wallet server 710 and to one of more application servers 1 to R 712. The cross connection is shown to include registration, and this indicates that a user with the user device must have been previously registered with the mobile wallet server in order to be able to use the "trust" features and other features of the disclosed system, excepting for the possibility of receiving invitations to join either the mobile wallet server or the one or more applications. It is to be appreciated that a mobile wallet application on each user device has been registered with a mobile wallet server and has a certain amount of data stored in a mobile wallet server database. It is also to be appreciated that an invitation to join a wallet network may include an invitation to add a mobile wallet application. Adding a mobile wallet application would include the registration process. Also as pictured at 724, user M+1 is portrayed in this example as having a mobile-thin application and initially does not have an application (SN Application 716 is shown in dashed line to indicate an initial state of not having a social network application).

The disclosed innovation thus can be seen to be broader than the previous examples and may include a shared thin wallet that is shared among more than one master wallet. For example, a child, perhaps in college, may have a thin wallet. That child may have a connection with a master wallet of a parent, as discussed above. But the child may also have a connection with a master wallet of a second person, as an example, another parent that may be separated from the first parent discussed. In such a case, the thin wallet may be seen as existing in a type of network akin to a social network. Other connections in a network may exist. A child may have such a relationship with a sibling. An individual may have a fiduciary relationship with a non-family member. Corporations may decide to have fiduciary relationships with suppliers, clients or customers. Society may evolve different social safety nets and the innovation disclosed here enables a finance type of social network. Further, the variety of social networks continue to proliferate, and financial transactions may be involved directly or indirectly within these social networks (either person to person or otherwise), the aspects of the trust-based innovation here find example applications in a wider sense of "social wallet." A social wallet may allow users to interact with most any social media platform to spread the connection (and share controls as desired) through a mobile wallet server.

In example 700, a user 1 with device 1 702 may have a mobile wallet application 704 as well as a SN application 706. The user 1 device 1 702 may be connected through a network 708 to both a mobile wallet server 710 and a plurality of application servers 1 to R 712. It is to be appreciated that user 1 device 1 702 has registered with mobile wallet server 710 and that at least registration information may be contained in mobile wallet server database 714. As has been discussed in previous examples, mobile wallet server database 714 may also contain default rules related to the mobile master wallet application 704 on user 1 device 1 702.

Similarly, other users with their respective devices such as user 2 device 1 716 with its own mobile wallet application mobile master 2 718 and a plurality of applications may be present on user 2 device 1. For the sake of this example, one of the plurality of applications is taken as social network ("SN") application 706. It is to be appreciated that SN and social network are used interchangeably.

A plurality of such user/devices 720 may exist up to M, where M is an integer. Each of these may, through network 708 be connected to each of a mobile wallet server 710 and a plurality of application servers 1 to R 712. For this example, an additional user/device, User M+1 device 1 724 may exist with a mobile wallet application Mobile-thin "A" 726, and initially user M+1 device 1 722 may initially lack a SN application (as indicated by dashed lines). User M+1 may receive an invitation to join SN through a shared connection as may be reflected in mobile wallet server database 714.

As noted, user M+1 device 1 724 initially does not have the social network application loaded on the device. In this instance, the shared relation of the mobile thin "A" application 726 of user M+1 to the Mobile Master 1 704 of user 1 device 1 702 enables an invite to join social network application through the network wallet. It is to be noted that user M+1 need not share a direct social network connection through social network application with users 2 through M.

Figure 7:
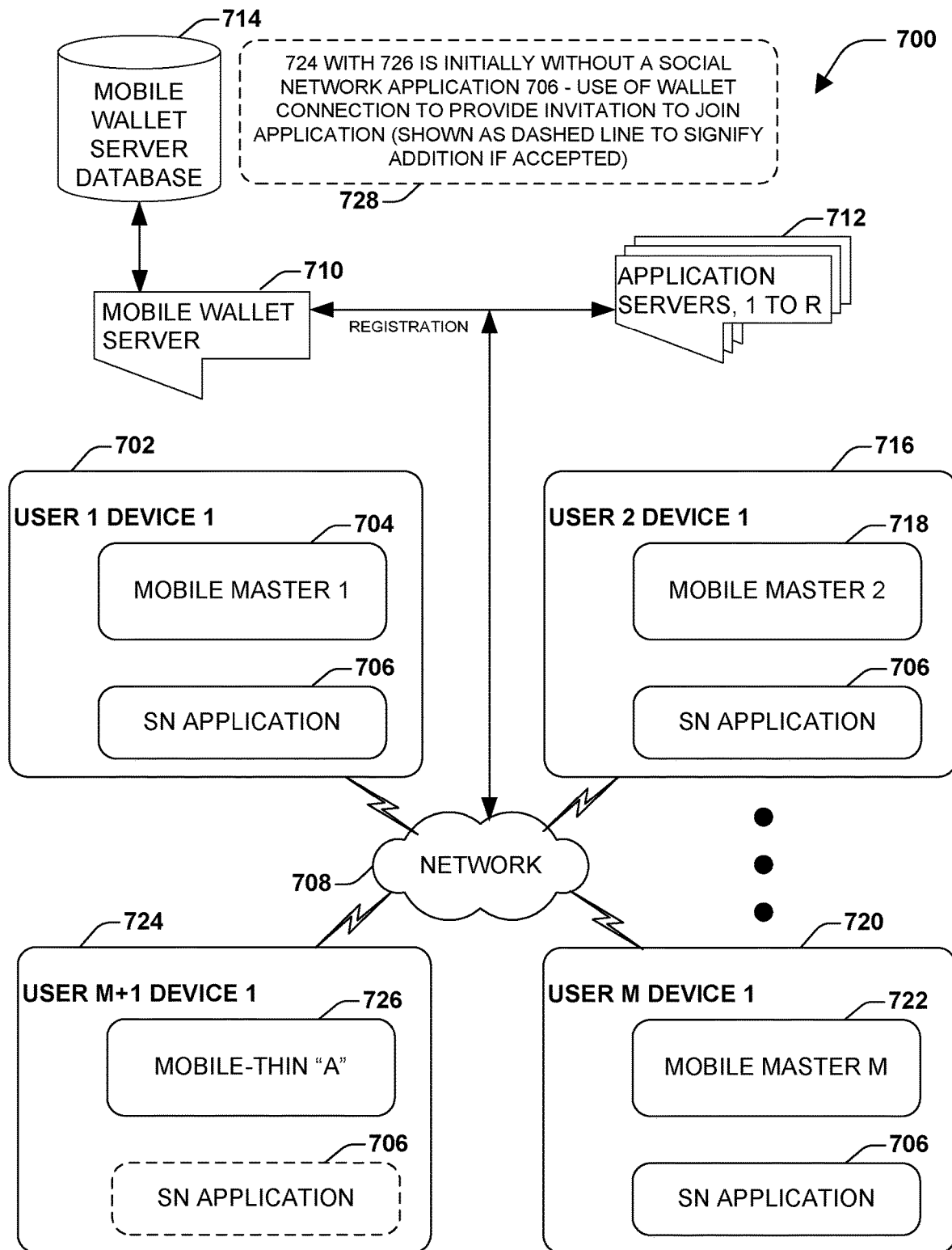
FIG. 7 is an illustration of an example interaction 700 in accordance with one or more aspects of the disclosed innovation.
Figure 8:
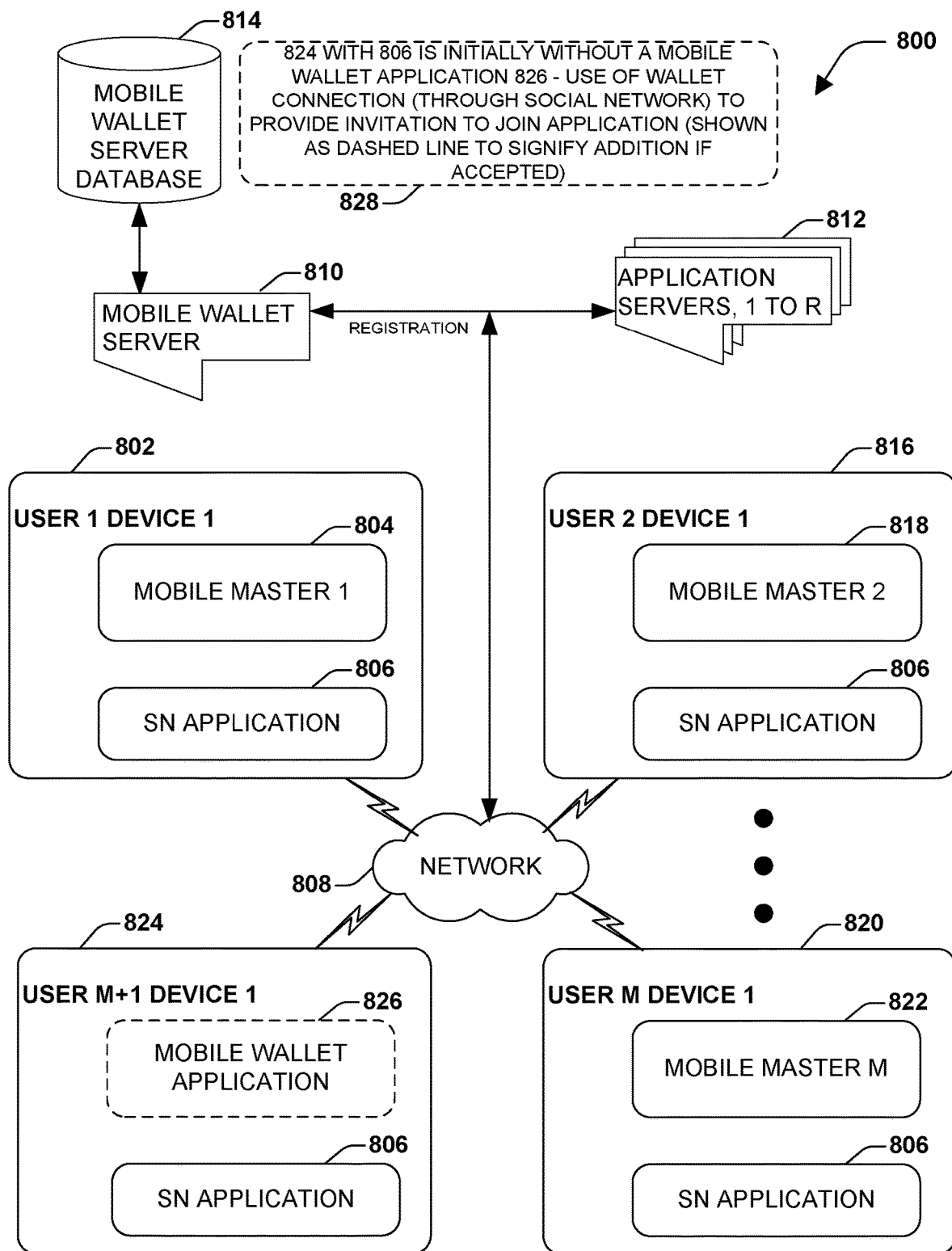
FIG. 8 is an illustration of an example interaction 800 in accordance with one or more embodiments of the disclosed innovation can be implemented.

Similar to FIG. 7, turning to FIG. 8, in yet another example embodiment, users devices that do not have a mobile wallet application, but that do have social network applications may be prompted to add a mobile wallet application. In this example, one may consider a user M+1 device 1 824, initially not having a mobile wallet application 826, but having SN Application 806. User M+1 device 1 may, through a social network application, indicate a desire to engage in a financial transaction, and make that desire known through the social network application. A different user device, for example user 1 device 1 802, with the social network application as well as a mobile wallet application may be connected in the social network application and express interest in the proposed financial transaction. Since there would initially be no match found in a mobile wallet server database, settings in an OSE of user 1 device 1 802 may be configured to invite user M to install and register a mobile wallet application in order to be able to consummate the transaction with the trust features of the present innovation. The invitation may be to install a number of mobile wallet applications, which may include a master wallet application or a mobile-thin application. An invitation may provide a sustained mobile wallet application presence on a device of user M+1, or in some embodiments provide for a temporary application presence that may not persist after the financial transaction is consummated. Aspects of the innovation for such embodiments still require registration with a mobile wallet server, for example, mobile wallet server 810. It is to be noted that user M+1 need not share a direct wallet network connection through mobile wallet server with users 2 through M.

Figure 9:
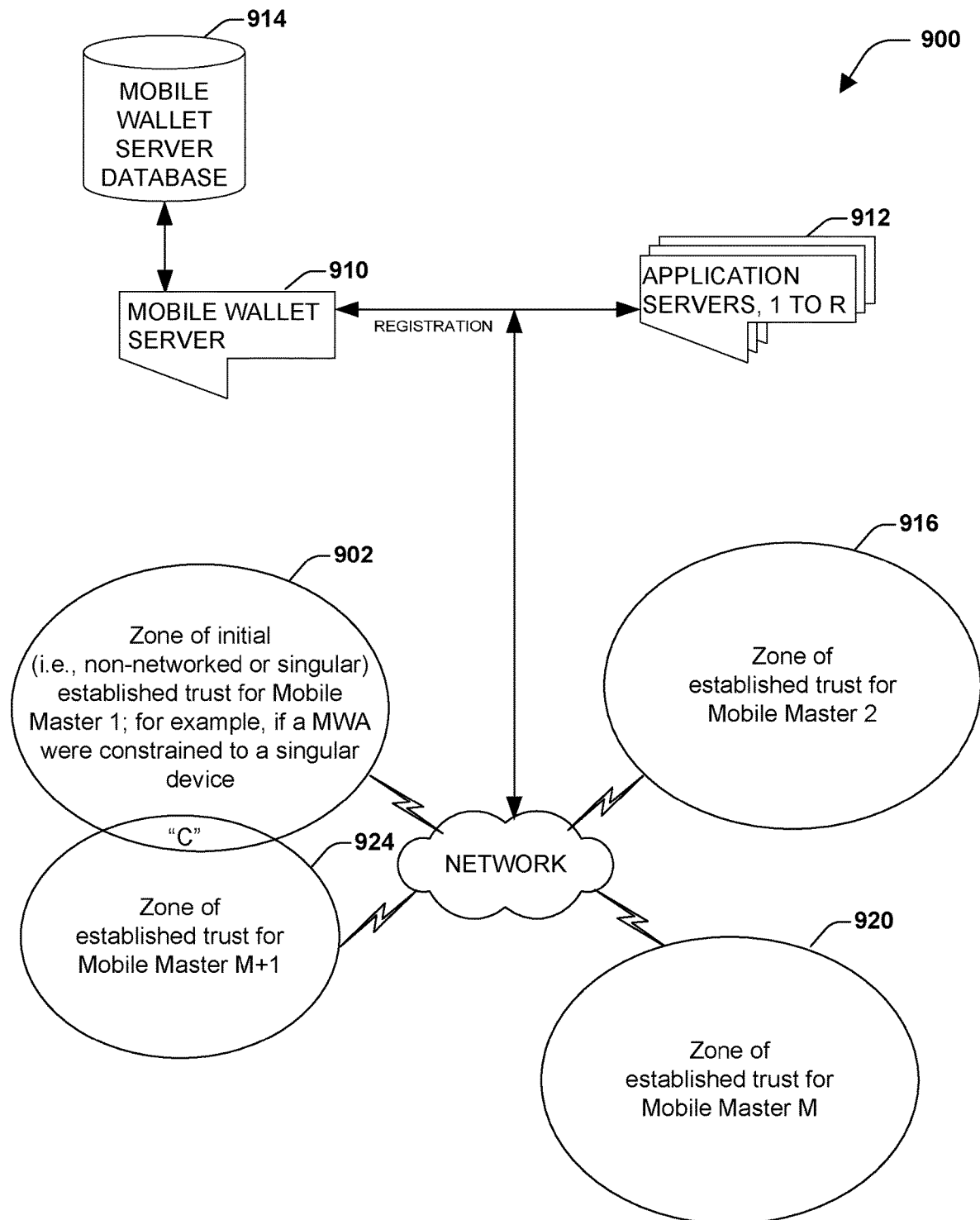
FIG. 9 is an illustration of an example interaction 900 in accordance with one or more embodiments of the disclosed innovation can be implemented.

Turning to FIG. 9, and applying examples of establishing "trust" per user/device, pictured may be zones of initial established trust. That is, a non-networked or singular trust that may be established for each user/device for that user/device with a particular ecommerce application (which may be a subset of the plurality of application servers, 1 to R 912). As may be expected from a simple first view, zone 902 may correspond to, for example from FIG. 7, user 1 device 1 702, zone 916 may correspond to user 2 device 1 716, up to user M device 1 720 having a corresponding zone 920. As discussed previously though, for user M+1 device 1 722 may through a master/thin client established relationship have a zone 922 that intersects with a first master wallet application belonging to user 1 device 1. It is to be appreciated that this is but one example and that the zone may intersect more than one corresponding master wallet application of more than one user/device (not shown for clarity).

Figure 10:
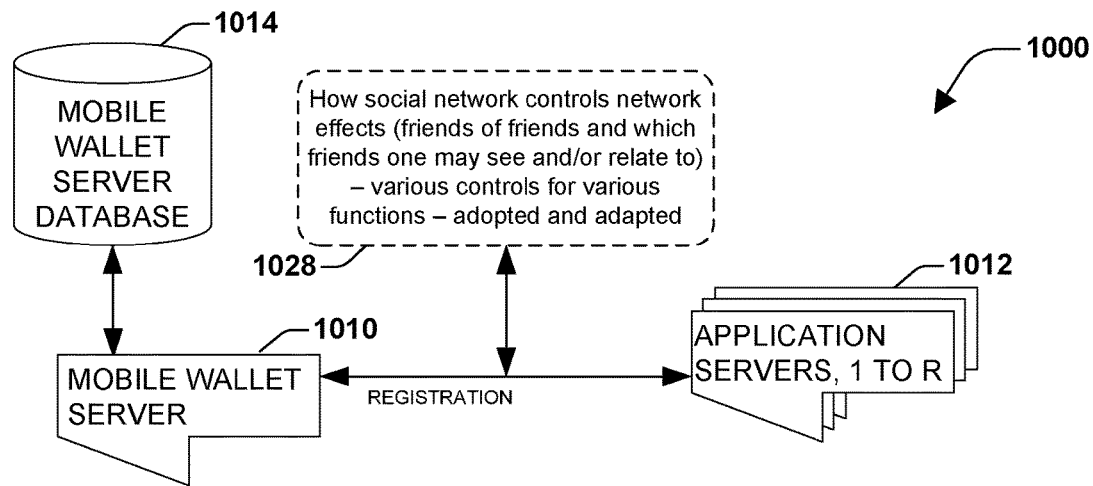
FIG. 10 is an illustration of an example interaction 1000 in accordance with one or more aspects of the disclosed innovation.
Figure 10:
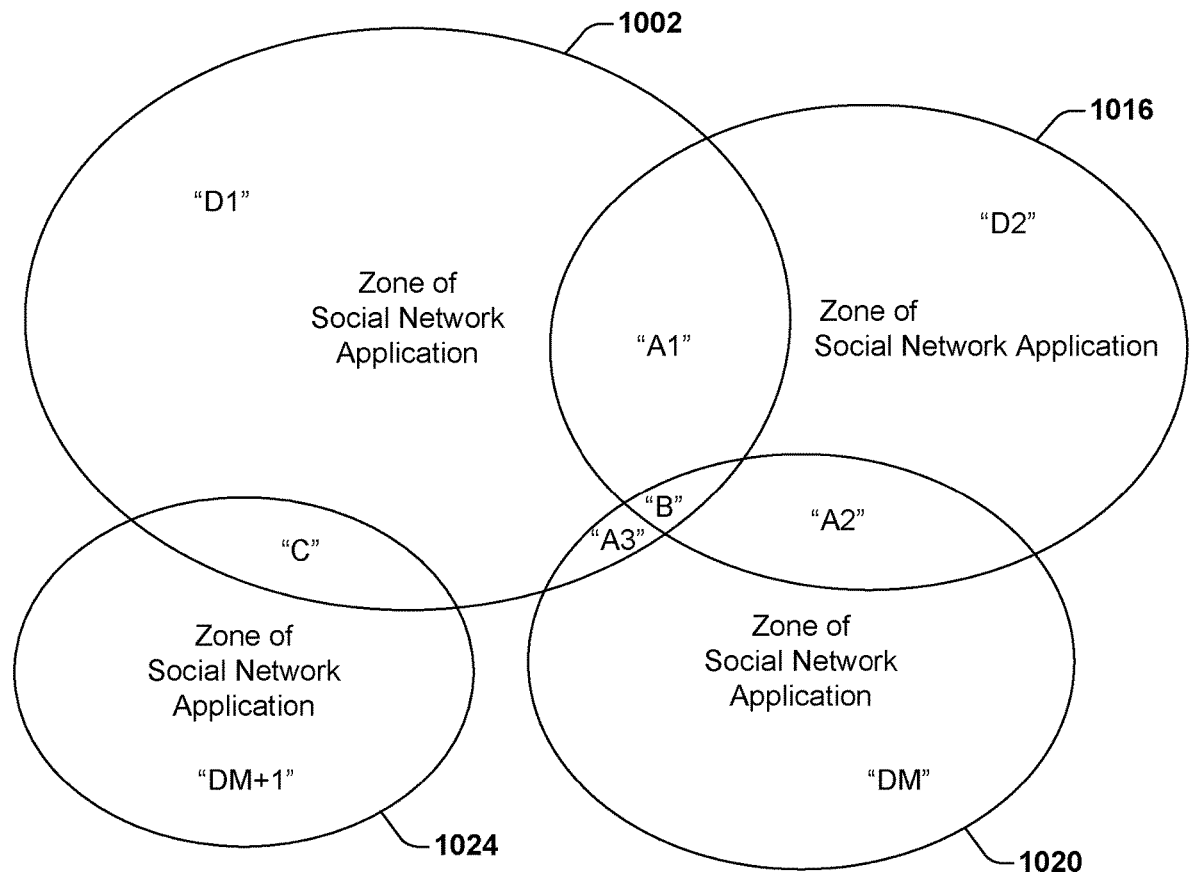

Turning to FIG. 10, a somewhat analogous "zone" example is pictured. In example 1000, zone 1002 may correspond to a direct zone of a social network application user 1 corresponding to user 1 702 from FIG. 7, for example. Likewise, 1016 may correspond to a direct zone of social network application for user 2, 1020 corresponds to the direct zone of user M and 1024 corresponds to direct zone of social network application for user M+1. It is to be appreciated that the zone of social network applications will likely not be constrained to a particular device. As pictured in FIG. 10, this example portrays overlap between the different users for a given social network application. It is to be appreciated that such overlap may not be static, and may be quite different from one social network application to the next. As pictured, "B" represents a situation in which users 1 through M share some portion of overlap and may be considered connected though the social media application. Likewise, as pictured, user M+1 is shown as to be connected through the social network application with user 1 with "C." From the plurality of application servers 1 to R 1012, the mobile wallet server 1010 may employ 1028, which is to say that social network applications (a subset of the plurality of application servers) may have their controls of network effects adopted and adapted by the mobile wallet server 1010, and associations may be stored in mobile wallet server database 1014.

Figure 11:
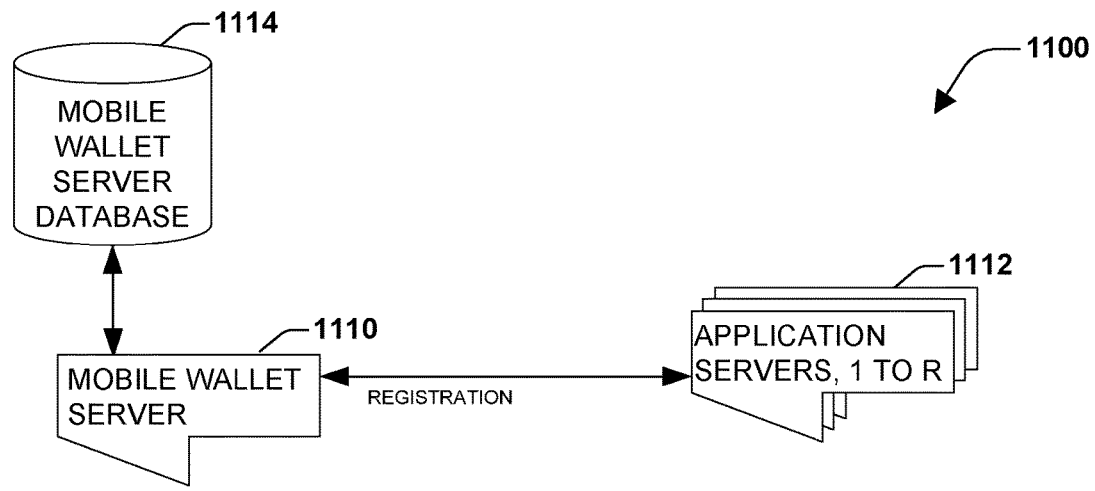
FIG. 11 is an illustration of an example interaction 1100 in accordance with one or more embodiments of the disclosed innovation can be implemented.
Figure 11:
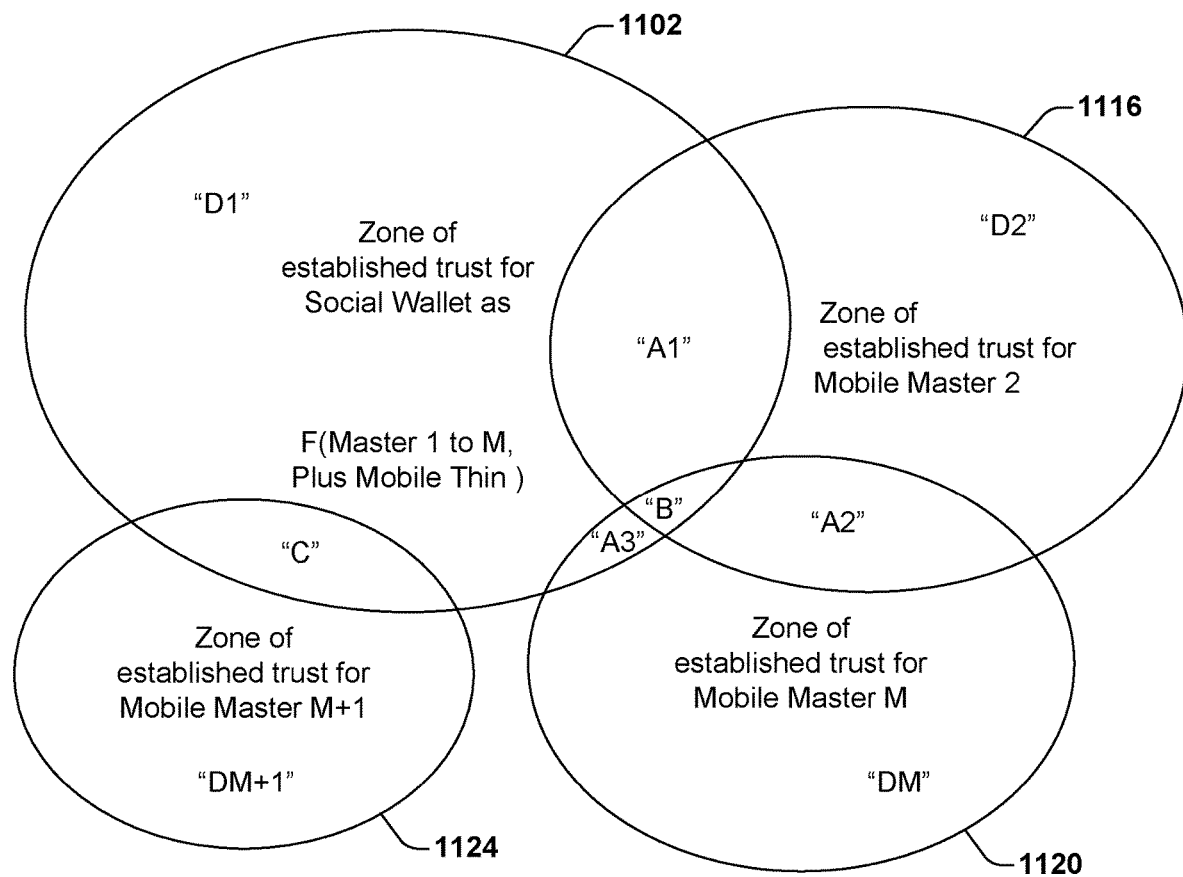

Turning now to FIG. 11, a different aspect of zones is disclosed showing the adopted and adapted network effects. The zones pictured in example 1100 may appear to match the zones of the social network interactions of example 1000, FIG. 10. To a certain degree, this is because the social wallet is enabled to reach though, adopt and adapt the zones of interaction that are created by the various social network applications. Further though, the interactions of the mobile wallet server 1112 and the plurality of application servers 1 to R 1118, as kept track of in mobile wallet server database 1114, provide that a different zone of established trust of a wallet network may exist than the overall zones of most any particular social network application.

Zones of established trust may be a function of the various users 1 through M+1 as well as rules and defaults as captured during registration (or modified thereafter) and reflected in mobile wallet server database 1114. Rules may be set, for example between a user 1 (Master 1) and a user 2 (Master 2) such that a tertiary "trust" between Master 1 and user M+1 is accepted. Different settings, rules and defaults, for example, may be chosen so as to not extend the "trust" of the mobile-thin "A" to user M. Thus "trust" zone for user M+1 may be viewed as the areas of Venn Diagram "DM+", "C", "D1", "A1" and "D2," may not include areas "B", "A3", "A2" and "DM." Invites and notices may be set up when User M joins the Wallet Network to accept invites from any trusted relationship, or particular trusted relationships. By comparing the original zones of FIG. 9, with the leveraged zones of FIG. 11, one can readily see the leverage provided in the zone of a social wallet as the social wallet "borrows" the connectiveness of the various social network applications. As is to be appreciated, since various social network applications operate on different modes, and may not only share different capabilities as well as different identifications, a mobile wallet server 1110 may control the invites, notices, appearances, and potential shared authority of the "trust" factors as those aspects were discussed previously (in some embodiments, the control resolves to device OSE, as discussed previously). Wallet network, thus controlled, may use the available connections afforded by the social network applications and cross reference those connections to the data base of members of a mobile wallet server network. Where matches are uncovered, a mobile wallet network then may leverage a wider social network application and its connectivity to expand (selectively) a wallet network. In some embodiments, individual members of a wallet network may retain control of the ability to both send and receive invites or notices (through for example, device OSEs), and inputs into a mobile wallet serve database 1114 (for example, during registration or invitation acceptance), can preset (or choose to modify) both the level of connectivity as well as set various levels of control that may be shared.

Various use examples may be explicated in order to show the power of this leverage. For one example, a user may be a corporate user and may wish to selectively advance invites to members of the mobile wallet server network who also happen to be members of a social network that is aligned with a particular social activism, for example, interest regarding the environment. Leveraging the environmental social network application, a wallet network may cross reference and determine a number of members associated with a mobile wallet server that are also members of the particular social network and who may additionally be open to receiving invitations or notices. Offers may be extended, then to this select group and such offers may involve the "trust" factors previously discussed in earlier embodiments. In this manner, a corporate user may provide a trusted transaction capability highly tuned to the benefits and interests of a specific wallet network, and enable transactions (said transactions may provide money flows in either direction) to be accomplished in a trust manner as discussed in earlier embodiments.

In another example embodiment, User M upon initiating a wallet network may engage a mobile wallet server database and selected social network applications to search for overlapping zones, for example the possible union of Venn diagrams of FIG. 10. A list of invites/notices prompted by user M (and sent to those in the mobile wallet server database who have indicated openness to such invites) may leverage the connectedness of the social network, subject to the participation (through registration) on the mobile wallet server (for example, mobile wallet server 1010 of FIG. 10). User M may invite or accept responses to invitations from each of the shown users (in an embodiment), or each of users indicating receptiveness as captured in each user's registration with a mobile wallet server.

In an embodiment, User M may selectively not choose to send invitations to subsets of users. For example in FIG. 11, M may choose to not invite User 2 as shown by 1116. The leveraged social wallet in this instance still reaches the area of the Venn diagram as indicated by "DM," "A3," "D1," "C," and "DM+1." The leverage gained can be contrasted with an initial zone of established trust for mobile master M 920 in FIG. 9. It is to be appreciated that the ability to selectively control the leveraged zone of established trust for Mobile Master M is highly flexible and can be set by pre-determined rules or modified on the fly.

Another use example may provide an example embodiment. In this example, user M upon registering with the mobile wallet server indicates a willingness partake in a wallet network, As user M has a mobile master application, the mobile wallet server may look to a mobile wallet server database for listed social network applications that have overlapping zones, as shown in FIG. 10. The list of invites/notices provided to user M may include the span of direct overlaps, as pictured in FIG. 11 of User 1, User 2, and the indirect overlap of user M+1 by way of the overlap between user 1 and user M+1. User M may invite or accept invitations from each of the shown users (per this example). User M may decline to include in its wallet network user 2. In this case, the wallet network for user M would be the areas "DM," "A3," "D1," "C," and "DM+1." The leverage then can be seen by comparing the zones of established trust for user M 920 in FIG. 9.

In another embodiment, a user, for example a business retailer, may desire to create a wallet network with its suppliers, and then open that wallet network to its customers, thereby enabling customers to engage directly with a supplier on established trust terms. The user creating a wallet network may specify specific rules that may act as filters to those invited to join a wallet network, and specified rules may provide various levels, offers, access and/or terms.

It is to be appreciated that a wallet network may be controlled per user per a user device's OSE as an OSE interacts with a mobile wallet server. The OSE and the connections as available through registration with a mobile wallet server leverage the social network application network effects. An OSE controlled indicator "attaching" to and using the network of a social network application may apply a layer of rules and controls "on top of" the social network.

As such, most any person to person activity may reflect the functionality of a social network in a connectiveness sense, and creation of wallet networks may leverage that functionality, with the OSE and mobile wallet server and mobile wallet database as disclosed.

Figure 12:
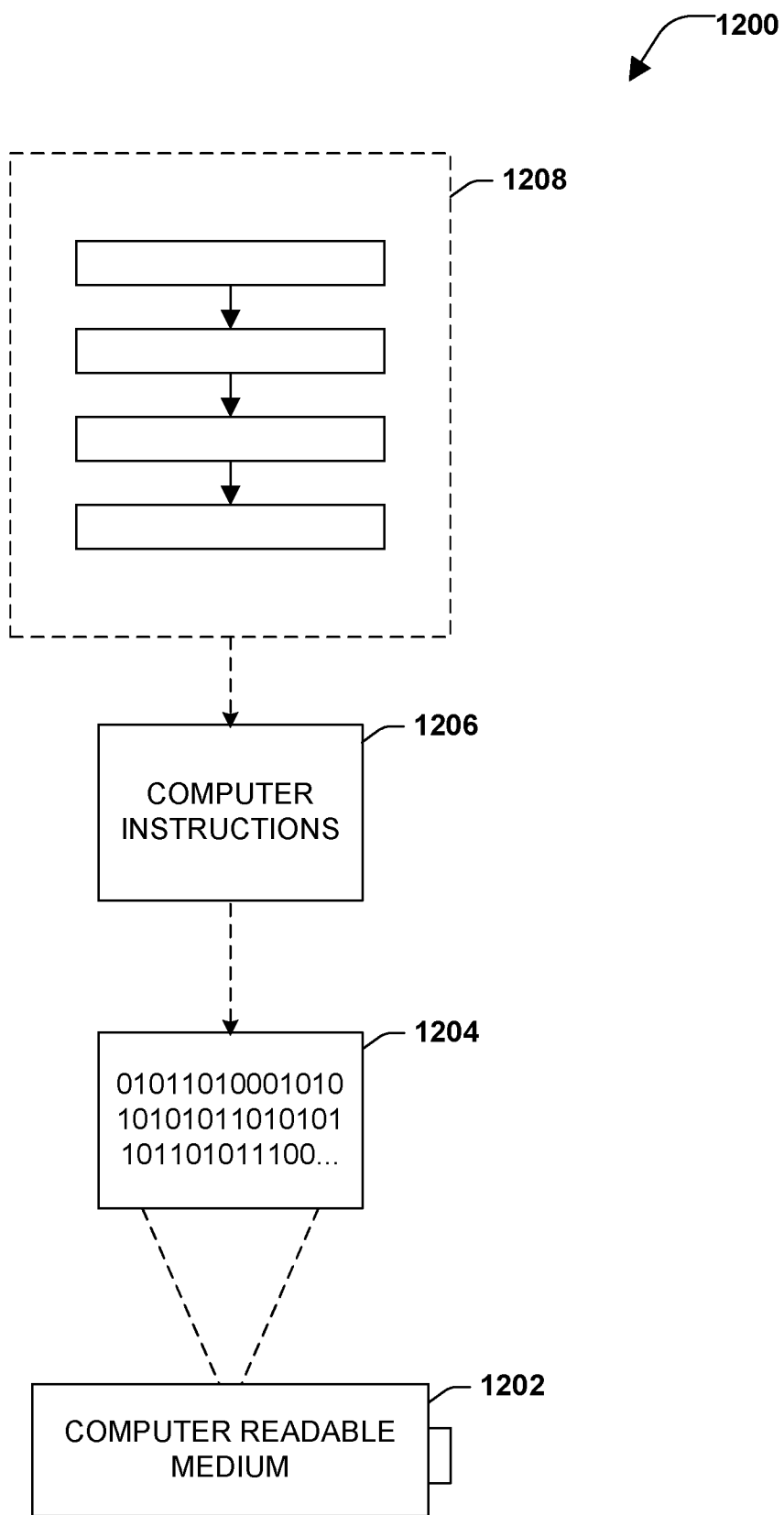
FIG. 12 is an illustration of an example computing environment where one or more of the provisions set forth herein can be implemented, according to one or more embodiments.

While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter Still another embodiment involves a computer-readable medium including processor-executable instructions configured to implement one or more embodiments of the techniques presented herein. An embodiment of a computer-readable medium or a computer-readable device devised in these ways is illustrated in FIG. 12, wherein an implementation 1200 includes a computer-readable medium 1202, such as a CD-R, DVD-R, flash drive, a platter of a hard disk drive, etc., on which is encoded computer-readable data 1204. This computer-readable data 1204, such as binary data including a plurality of zero's and one's as shown in 1204, in turn includes a set of computer instructions 1206 configured to operate according to one or more of the principles set forth herein. In one such embodiment 1200, the processor-executable computer instructions 1206 may be configured to perform a method 1208, such as the method 300 of FIG. 3. In another embodiment, the processor-executable instructions 1206 may be configured to implement a system, such as the system 200 of FIG. 2. Many such computer-readable media may be devised by those of ordinary skill in the art that are configured to operate in accordance with the techniques presented herein.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 13:
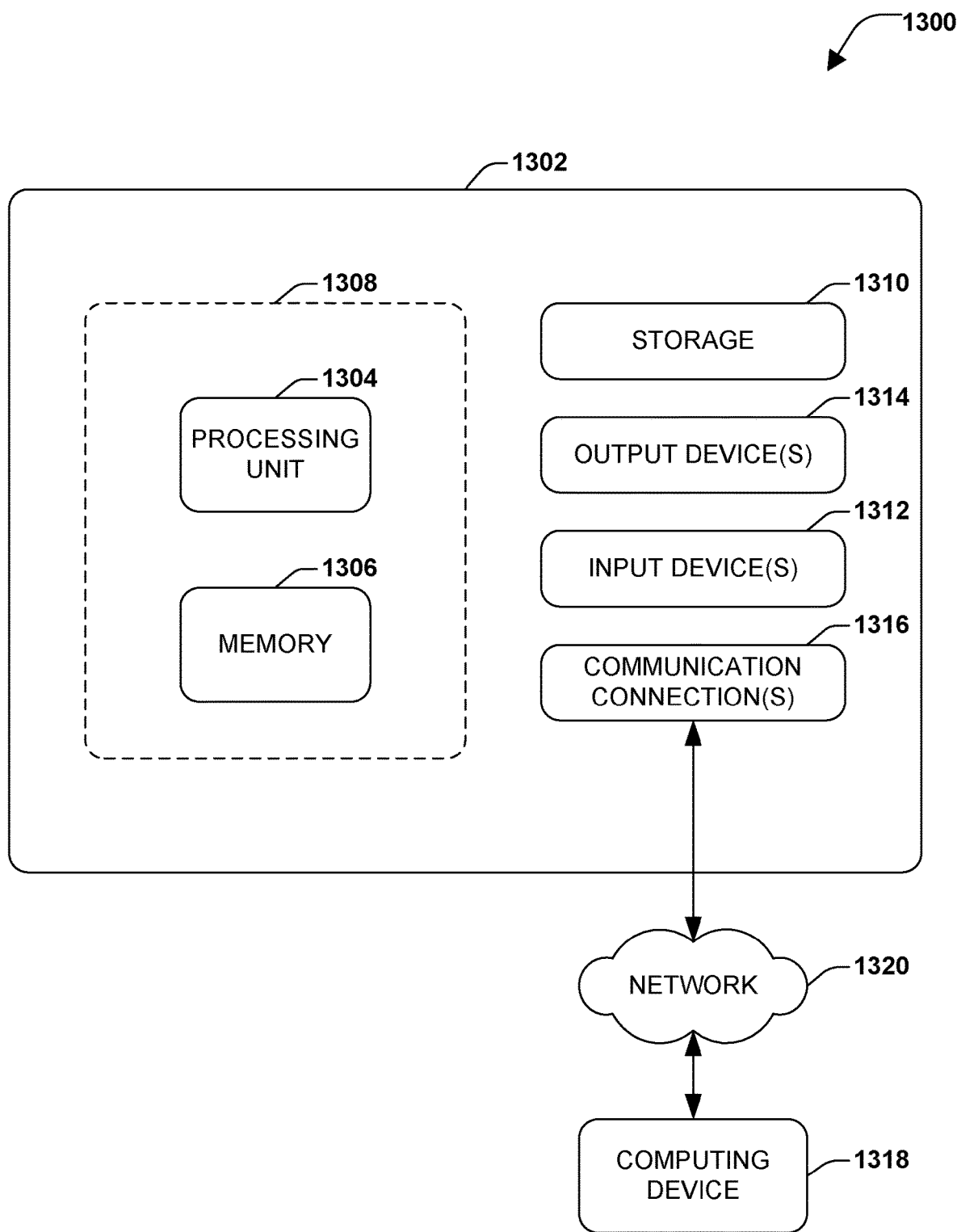
FIG. 13 is an illustration of an example computing environment where one or more of the provisions set forth herein can be implemented, according to one or more embodiments.

FIG. 13 and the following discussion provide a description of a suitable computing environment to implement embodiments of one or more of the provisions set forth herein. The operating environment of FIG. 13 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include most any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APis), data structures, and the like, that perform one or more tasks or implement one or more abstract data types. Typically, the functionality of the computer readable instructions are combined or distributed as desired in various environments.

FIG. 13 illustrates a system 1300 including a computing device 1302 configured to implement one or more embodiments provided herein. In one configuration, computing device 1302 includes at least one processing unit 1304 and memory 1306. Depending on the exact configuration and type of computing device, memory 1306 may be volatile, such as RAM, nonvolatile, such as ROM, flash memory, etc., or a combination of the two. This configuration is illustrated in FIG. 13 by dashed line 1308.

In other embodiments, device 1302 includes additional features or functionality. For example, device 1302 may include additional storage such as removable storage or non-removable storage, including, but not limited to, magnetic storage, optical storage, etc. Such additional storage is illustrated in FIG. 13 by storage 1310. In one or more embodiments, computer readable instructions to implement one or more embodiments provided herein are in storage 1310. Storage 1310 may store other computer readable instructions to implement an operating system, an application program, etc. Computer readable instructions may be loaded in memory 1306 for execution by processing unit 1304, for example.

The term "computer readable media" as used herein includes computer storage media. Computer storage media includes volatile and nonvolatile, removable and non-removable media implemented in most any method or technology for storage of information such as computer readable instructions or other data. Memory 1306 and storage 1310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or most any other medium which may be used to store the desired information and which may be accessed by device 1302. Most any such computer storage media is part of device 1302.

Device 1302 includes input device(s) 1312 such as keyboard, mouse, pen, voice input device, touch input device, infrared cameras, video input devices, or most any other input device. Output device(s) 1314 such as one or more displays, speakers, printers, or most any other output device may be included with device 1302. Input device(s) 1312 and output device(s) 1314 may be connected to device 1302 via a wired connection, wireless connection, or most any combination thereof. In one or more embodiments, an input device or an output device from another computing device may be used as input device(s) 1312 or output device(s) 1314 for computing device 1302. Device 1302 may include communication connection(s) 1316 to facilitate communications with one or more other devices 1318, and such communication may occur over a network, for example network 1320.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form Additionally, at least one of A and Band/or the like generally means A or B or both A and B. Further, to the extent that "includes", "having", "has", "with", or variants thereof are used in either the detailed description or the claims, such terms are intended to be inclusive in a manner similar to the term "comprising."

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of enabling secured transactions between a computing device within a wallet network and at least one ecommerce application, the method comprising:
    receiving, by a mobile wallet server, a wallet network initiation request from a first computing device that is registered with a mobile wallet application,
    initiating the wallet network by:
        receiving, by the mobile wallet server, from an OSE of the first computing device, an indication of a plurality of social network applications on the first computing device,
        transmitting, by the mobile wallet server to the OSE of the first computing device and based on the indication of the plurality of social network applications on the first computing device, an indication of: (i) a plurality of matches related to a subset of the plurality of social network applications and (ii) registered users of the mobile wallet application,
        receiving, from the OSE of the first computing device, acceptance of invites that have been sent by the OSE of the first computing device to registered computing devices of the registered users of a matched wallet network and a social application network, and
        initiating an initial rule set comprising at least in part established trust levels that permit a secured transaction to proceed that is applied to each of the accepting registered computing devices; and
    receiving, by the mobile wallet server and from a subset of the first computing device and the accepting registered computing devices, an engagement request with the at least one ecommerce application that has been registered with the mobile wallet application,
    wherein a backend processing by the mobile wallet server obtains funds without sharing a subset of sensitive data, associated with at least one of a user or owner associated with at least one device in the wallet network, with the ecommerce application for the secured transaction.

2. The method of claim 1, wherein the mobile wallet server sends, to the OSE of each of the accepting registered computing devices, an adopt and adapt capture of a particular connectivity and levels of a subset of the plurality of social network applications, and wherein the initial rule set is populated with at least in part relationship data of relationships in a particular social network application.

3. The method of claim 1, wherein the mobile wallet server sends, to the OSE of each of the accepting registered computing devices, as a subset of the initial rule set a predetermined multi-master conflict resolution rule and a multi-master conflict resolution rule set enables the OSE of each device in the wallet network to interact in real time or near real time with other OSE of each of the accepting registered computing devices to dynamically negotiate changes to a default resolution rule.

4. The method of claim 3, wherein the mobile wallet server sends, to the OSE of each of the accepting registered computing devices, as a subset of the initial rule set an individual device control ruleset.

5. The method of claim 4, wherein the mobile wallet server sends, to the OSE of each of the accepting registered computing devices, as a subset of the initial rule set an individual device control rule set that includes rules controlling a "look and feel" of an indicator of the wallet network in the mobile wallet application.

6. The method of claim 1, wherein the at least one ecommerce application is at least a subset of the plurality of social network applications.

7. The method of claim 1, wherein the wallet network comprises a vendor/supplier/customer network.

8. The method of claim 1, wherein the mobile wallet server sends, to a computing device that is missing either of a particular mobile wallet application or a particular subset of the plurality of social network applications, a wallet network invite that includes an invite to load a particular missing application on the computing device.

9. The method of claim 1, wherein the mobile wallet server provides, to the OSE of each assigned registered computing device, the secured transaction to be bidirectional with the ecommerce application.

10. The method of claim 1, wherein the initiated wallet network comprises permanence of a range from a predetermined amount of time to a transience of completing the secured transaction.

11. A mobile wallet server for enabling secured transactions between a computing device within a wallet network and at least one ecommerce application, comprising:
a processor configured to:
receive a wallet network initiation request from a first computing device that is registered with a mobile wallet application,
initiate the wallet network by:
receiving from an OSE of the first computing device, an indication of a plurality of social network applications on the first computing device,
transmitting, to the OSE of the first computing device and based on the indication of the plurality of social network applications on the first computing device, an indication of: (i) a plurality of matches related to a subset of the plurality of social network applications and (ii) registered users of the mobile wallet application,
receiving, from the OSE of the first computing device, acceptance of invites that have been sent by the OSE of the first computing device to registered computing devices of the registered users of a matched wallet network and a social application network, and
initiating an initial rule set comprising at least in part established trust levels that permit a secured transaction to proceed that is applied to each of the accepting registered computing devices; and
receive, from a subset of the first computing device and the accepting registered computing devices, an engagement request with the at least one ecommerce application that has been registered with the mobile wallet application,
wherein a backend processing by the mobile wallet server obtains funds without sharing a subset of sensitive data, associated with at least one of a user or owner associated with at least one device in the wallet network, with the ecommerce application for the secured transaction.

12. The mobile wallet server of claim 11, wherein the processor is further configured to:
cause transmission of, to the OSE of each of the accepting registered computing devices, an adopt and adapt capture of a particular connectivity and levels of a subset of the plurality of social network applications, wherein the initial rule set is populated with at least in part relationship data of relationships in a particular social network application.

13. The mobile wallet server of claim 11, wherein the processor is further configured to:
cause transmission of, to the OSE of each of the accepting registered computing devices and as a subset of the initial rule set, a predetermined multi-master conflict resolution rule and a multi-master conflict resolution rule set enables the OSE of each device in the wallet network to interact in real time or near real time with other OSE of each of the accepting registered computing devices to dynamically negotiate changes to a default resolution rule.

14. The mobile wallet server of claim 11, wherein the at least one ecommerce application is at least a subset of the plurality of social network applications.

15. The mobile wallet server of claim 11, wherein the wallet network comprises a vendor/supplier/customer network.

16. A computer program product comprising at least one non-transitory computer-readable storage medium storing software instructions for enabling secured transactions between a computing device within a wallet network and at least one ecommerce application, the software instructions, when executed, cause an apparatus to:
receive a wallet network initiation request from a first computing device that is registered with a mobile wallet application,
initiate the wallet network by:
receiving from an OSE of the first computing device, an indication of a plurality of social network applications on the first computing device,
transmitting, to the OSE of the first computing device and based on the indication of the plurality of social network applications on the first computing device, an indication of: (i) a plurality of matches related to a subset of the plurality of social network applications and (ii) registered users of the mobile wallet application, and
initiating an initial rule set comprising at least in part established trust levels that permit a secured transaction to proceed that is applied to each of the accepting registered computing devices; and
receive, from a subset of the first computing device and the accepting registered computing devices, an engagement request with the at least one ecommerce application that has been registered with the mobile wallet application,
wherein a backend processing by the mobile wallet server obtains funds without sharing a subset of sensitive data, associated with at least one of a user or owner associated with at least one device in the wallet network, with the ecommerce application for the secured transaction.

17. The computer program product of claim 16, wherein the software instructions further causes the apparatus to:
send, to the OSE of each of the accepting registered computing devices, an adopt and adapt capture of a particular connectivity and levels of a subset of the plurality of social network applications, wherein the initial rule set is populated with at least in part relationship data of relationships a particular social network application.

18. The computer program product of claim 16, wherein the software instructions further cause the apparatus to:
send, to the OSE of each of the accepting registered computing devices and as a subset of the initial rule set, a predetermined multi-master conflict resolution rule and a multi-master conflict resolution rule set enables the OSE of each device in the wallet network to interact in real time or near real time with other OSE of each of the accepting registered computing device to dynamically negotiate changes to a default resolution rule.

19. The computer program product of claim 18, wherein the at least one ecommerce application is at least a subset of the plurality of social network applications.

20. The computer program product of claim 19, wherein the wallet network comprises a vendor/supplier/customer network.

* * * * *